US012503334B2

(12) United States Patent
Stein et al.

(10) Patent No.: US 12,503,334 B2
(45) Date of Patent: Dec. 23, 2025

(54) ELEVATOR SYSTEM AND METHOD FOR OPERATING SAME

(71) Applicants: Avraham Stein, Oranit (IL); Avigdor Hirsch, Rehovot (IL); Meir Fogel, Rehovot (IL)

(72) Inventors: Avraham Stein, Oranit (IL); Avigdor Hirsch, Rehovot (IL); Meir Fogel, Rehovot (IL)

( * ) Notice: Subject to any disclaimer, the term of this patent is extended or adjusted under 35 U.S.C. 154(b) by 1408 days.

(21) Appl. No.: 17/121,859

(22) Filed: Dec. 15, 2020

(65) Prior Publication Data

US 2021/0214182 A1 Jul. 15, 2021

(30) Foreign Application Priority Data

Jan. 15, 2020 (IL) .......................................... 272062

(51) Int. Cl.
*B66B 1/28* (2006.01)
*B66B 1/34* (2006.01)
*B66B 1/46* (2006.01)

(52) U.S. Cl.
CPC .............. *B66B 1/28* (2013.01); *B66B 1/3407* (2013.01); *B66B 1/468* (2013.01); *B66B 2201/101* (2013.01); *B66B 2201/103* (2013.01); *B66B 2201/24* (2013.01); *B66B 2201/4615* (2013.01); *B66B 2201/463* (2013.01); *B66B 2201/4638* (2013.01); *B66B 2201/4653* (2013.01)

(58) Field of Classification Search
CPC ......... B66B 1/28; B66B 1/3407; B66B 1/468; B66B 2201/101; B66B 2201/103; B66B 2201/24; B66B 2201/4615; B66B 2201/463; B66B 2201/4638; B66B 2201/4653; B66B 2201/401; B66B 2201/405; B66B 1/2416; B66B 1/24; B66B 1/46
See application file for complete search history.

(56) References Cited

U.S. PATENT DOCUMENTS

2011/0100758 A1* 5/2011 Zweig ...................... B66B 1/468
187/247
2013/0126277 A1* 5/2013 Friedman .................. B66B 3/00
187/384

FOREIGN PATENT DOCUMENTS

EP 2583928 A1 * 4/2013 ........... B66B 5/0031
EP 3798171 A1 * 3/2021 ............... B66B 1/46
(Continued)

*Primary Examiner* — Jeffrey Donels
(74) *Attorney, Agent, or Firm* — Sughrue Mion, PLLC

(57) ABSTRACT

A method for operating an elevator including operating the elevator in a pre-programmed sequence to stop at pre-designated floors in a predetermined order, upon receipt of an indication that a user at a given floor wishes to ride the elevator, temporarily not performing part of the pre-programmed sequence in order to arrive at the given floor with minimum delay and thereafter, in the absence of another indication that a user wishes to ride the elevator, continuing to temporarily not perform part of the pre-programmed sequence in order to arrive at a pre-designated egress floor with minimum delay and thereafter operating the elevator in the pre-programmed sequence including performing the part of the pre-programmed sequence to stop at pre-designated floors at pre-programmed times until receipt of an indication that a user at a given floor wishes to ride the elevator.

20 Claims, 36 Drawing Sheets

(56) References Cited

FOREIGN PATENT DOCUMENTS

| | | | | | |
|---|---|---|---|---|---|
| JP | 2012056653 | A | * | 3/2012 | |
| WO | WO-2013035060 | A1 | * | 3/2013 | ............. B66B 17/12 |

* cited by examiner

ELEVATOR SYSTEM AND METHOD FOR OPERATING SAME

FIELD OF THE INVENTION

The present invention relates to elevators and more particularly to specialized elevator controls.

BACKGROUND OF THE INVENTION

Various types of elevator controls are known in the art. These include elevator controls which are particularly suitable for Sabbath observers, who do not operate electrical devices on the Sabbath.

SUMMARY OF THE INVENTION

The present invention seeks to provide an improved elevator system and improved elevator controls for use in operating existing elevators.

There is thus provided in accordance with a preferred embodiment of the present invention a method for operating an elevator including operating the elevator in a pre-programmed sequence to stop at pre-designated floors in a predetermined order, upon receipt of an indication that a user at a given floor wishes to ride the elevator, temporarily not performing part of the pre-programmed sequence in order to arrive at the given floor with minimum delay and thereafter, in the absence of another indication that a user wishes to ride the elevator, continuing to temporarily not perform part of the pre-programmed sequence in order to arrive at a pre-designated egress floor with minimum delay and thereafter operating the elevator in the pre-programmed sequence including performing the part of the pre-programmed sequence to stop at pre-designated floors at pre-programmed times until receipt of an indication that a user at a given floor wishes to ride the elevator.

In accordance with a preferred embodiment of the present invention the pre-programmed sequence includes a main routine wherein the elevator car moves upward floor by floor and downward floor by floor in a predetermined sequence and a subroutine wherein the elevator car stops at a pre-designated floor, opens its doors, waits and then closes its doors. Additionally, the part of the pre-programmed sequence includes at least part of the subroutine. Alternatively, the part of the pre-programmed sequence includes all of the subroutine.

In accordance with a preferred embodiment of the present invention in the presence of another indication that a user wishes to ride the elevator at a different floor, the elevator car stops at the additional floor.

Preferably, the indication that a user at a given floor wishes to ride the elevator is generated by sensing the presence of a person in predetermined propinquity to the elevator at the given floor. Additionally or alternatively, the indication that a user at a given floor wishes to ride the elevator is generated by sensing an optical code in predetermined propinquity to the elevator at the given floor. Alternatively or additionally, the indication that a user at a given floor wishes to ride the elevator is generated by sensing an RFID tag in predetermined propinquity to the elevator at the given floor. In accordance with a preferred embodiment of the present invention the indication that a user at a given floor wishes to ride the elevator is generated by the user operating an elevator call switch at the given floor.

Preferably, the predetermined egress floor is selectably pre-programmed. Alternatively, the predetermined egress floor is indicated by the optical code. In accordance with a preferred embodiment of the present invention the predetermined egress floor is indicated by the RFID tag. Alternatively, the predetermined egress floor is indicated by the user.

In accordance with a preferred embodiment of the present invention in the presence of an indication that an additional user wishes to ride the elevator, the method also includes continuing to temporarily not perform part of the pre-programmed sequence in order to arrive at a floor at which the additional user is present with minimum delay, without departing from the predetermined order.

There is also provided in accordance with another preferred embodiment of the present invention an elevator system including an elevator car arranged in an elevator shaft and having access to a plurality of pre-designated floors in a building, an elevator car driving mechanism, at least one user presence sensor arranged to sense the presence of a user at at least one of the plurality of pre-designated floors and a computerized elevator controller, the computerized elevator controller being configured to operate the elevator in a pre-programmed sequence to stop at the pre-designated floors in a predetermined order, upon receipt of an indication that a user at a given floor wishes to ride the elevator, temporarily not performing part of the pre-programmed sequence in order to arrive at the given floor with minimum delay, thereafter, in the absence of another indication that a user wishes to ride the elevator, continuing to temporarily not perform part of the pre-programmed sequence in order to arrive at a pre-designated egress floor with minimum delay and thereafter operating the elevator in the pre-programmed sequence including performing the part of the pre-programmed sequence to stop at pre-designated floors at pre-programmed times until receipt of an indication that a user at a given floor wishes to ride the elevator.

In accordance with a preferred embodiment of the present invention the pre-programmed sequence includes a main routine wherein the elevator car moves upward floor by floor and downward floor by floor in a predetermined sequence and a subroutine wherein the elevator car stops at a pre-designated floor, opens its doors, waits and then closes its doors.

Preferably, the part of the pre-programmed sequence includes at least part of the subroutine. In accordance with a preferred embodiment of the present invention the part of the pre-programmed sequence includes all of the subroutine.

In accordance with a preferred embodiment of the present invention in the presence of another indication that a user wishes to ride the elevator at a different floor, the computerized elevator controller is operative to stop the elevator car at the additional floor.

In accordance with a preferred embodiment of the present invention the indication that a user at a given floor wishes to ride the elevator is generated using the at least one user presence sensor to sense the presence of a person in predetermined propinquity to the elevator at the given floor. Additionally or alternatively, the indication that a user at a given floor wishes to ride the elevator is generated using the at least one user presence sensor to sense an optical code in predetermined propinquity to the elevator at the given floor. In accordance with a preferred embodiment of the present invention the indication that a user at a given floor wishes to ride the elevator is generated using the at least one user presence sensor to sense an RFID tag in predetermined propinquity to the elevator at the given floor. Additionally or alternatively, the indication that a user at a given floor wishes to ride the elevator is generated by the user operating an elevator call switch at the given floor.

Preferably, the predetermined egress floor is selectably pre-programmed. Alternatively, the predetermined egress floor is indicated by at least one of the optical code, the RFID tag or by the user.

In accordance with a preferred embodiment of the present invention in the presence of an indication that an additional user wishes to ride the elevator, the computerized elevator controller is operative to continue to temporarily not perform part of the pre-programmed sequence in order to arrive at a floor at which the additional user is present with minimum delay, without departing from the predetermined order.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 5:
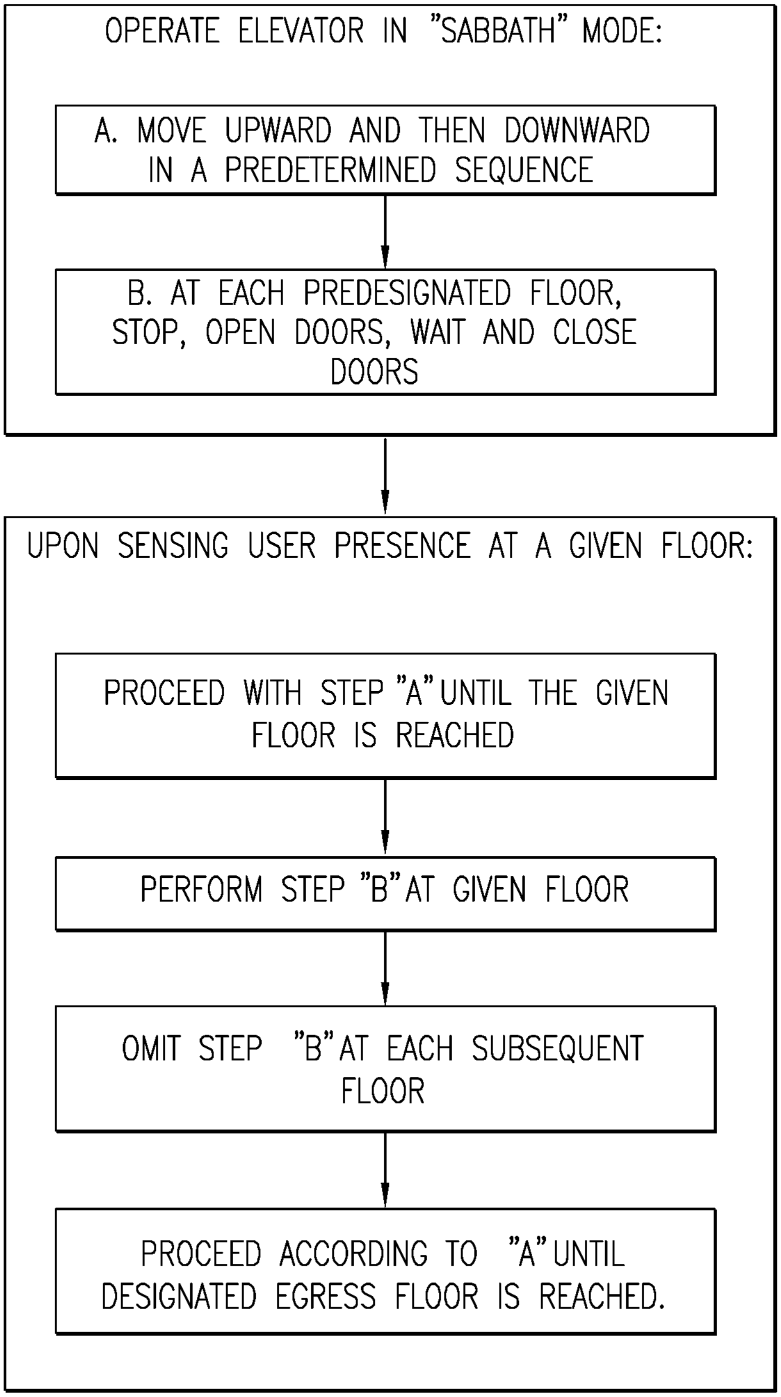
FIG. 5 is a simplified flow chart illustrating the operation of the elevator shown in FIGS. 1A-1H.

Reference is now made to FIGS. 1A-1H and to FIG. 5, which illustrate an elevator system, an elevator control and elevator operation in accordance with a preferred embodiment of the present invention. The present invention relates to an improvement in conventional operation of an elevator in a Sabbath mode. Conventional operation of an elevator in a Sabbath mode involves pre-programmed movement and operation of the elevator, typically in the following sequence:

The elevator goes up from a base floor, stopping at predesignated floors. At each floor at which the elevator stops, the elevator doors are opened and kept open for a predesignated time duration and then closed. The elevator then moves up to the next predesignated floor. When the elevator reaches the highest designated floor, it moves downward to one or more predesignated floors. It is appreciated that the predesignated floors may be every floor or only some floors. It is also appreciated that the same or different floors may be designated floors during upward movement of the elevator and downward movement of the elevator.

It is appreciated that the foregoing sequence is somewhat time consuming for users and inconvenient for users who are not Sabbath observers. Often a separate elevator is provided for use by non-Sabbath observers, so as to avoid this inconvenience.

The present invention seeks to make the operation of an elevator in a Sabbath mode more time efficient and to avoid much of the inconvenience to non-Sabbath observers.

As seen in FIGS. 1A-1H, there is shown a typical building having a ground floor and 8 floors above the ground floor. An elevator is provided and has a selectably openable door 100 at each floor. A user presence sensor 110 is provided in the vicinity of each selectably openable door 100 for sensing the presence of a user.

Reference is additionally made to FIGS. 4A-4D, which are simplified pictorial illustrations of four alternative embodiments of generating an indication that a user at a given floor wishes to ride the elevator. As seen in FIGS. 4A-4D, user presence sensor 110 may be one of a number of possible sensors.

Figure 4A:
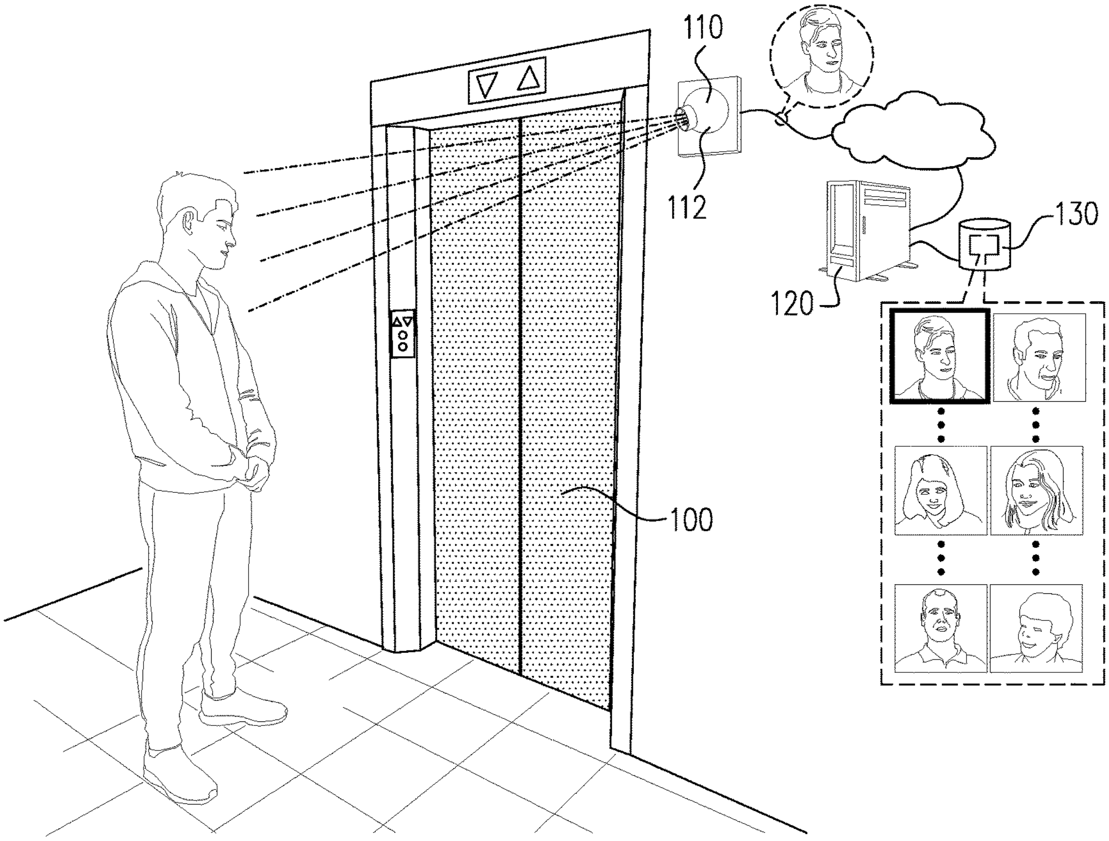
FIGS. 4A-4D are simplified pictorial illustrations of four alternative embodiments of generating an indication that a user at a given floor wishes to ride the elevator.

As seen in FIG. 4A, the user presence sensor 110 may be a camera 112, which views the face of a user. In such a case, the output of the camera 112 may be supplied to face recognition software, residing on a computer 120, which recognizes the user and, employing a database 130, associates the user with a pre-designated user-specific egress floor, such as the floor on which the user lives.

Figure 4B:
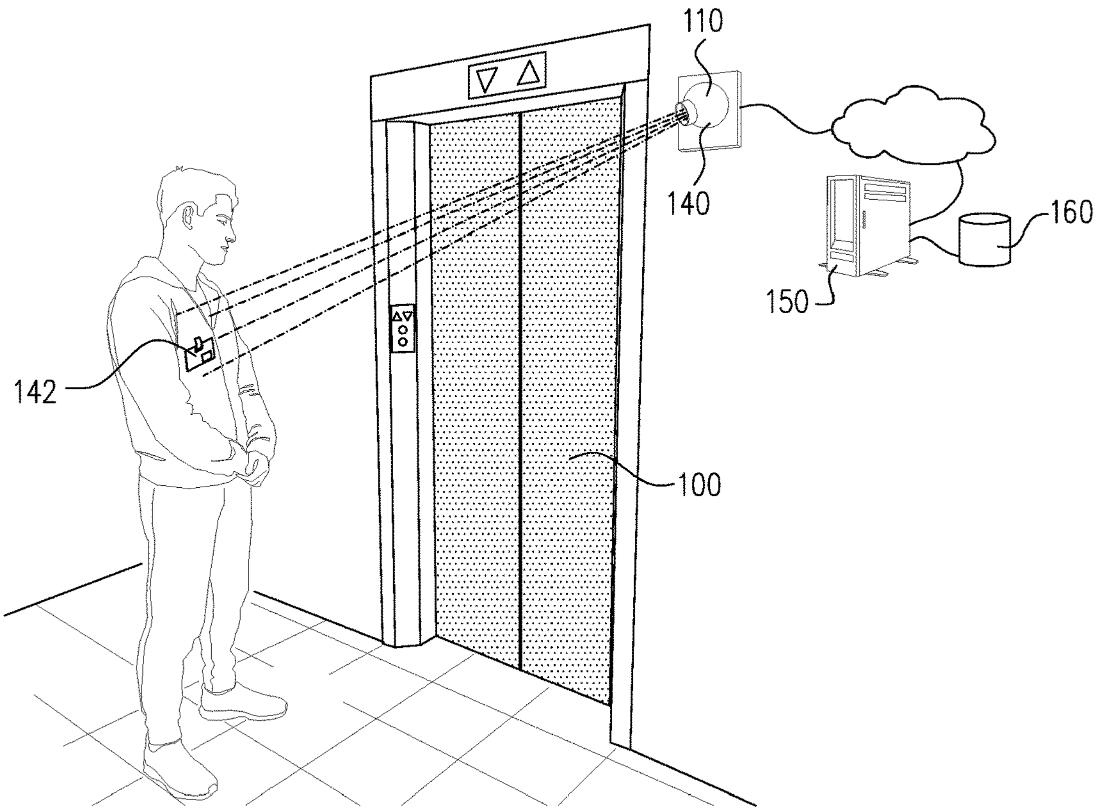

As seen in FIG. 4B, an alternative user presence sensor 110 may be a bar-code reader 140, which reads a tag 142, including a barcode, worn by a user. In such a case, the output of the reader may be supplied to a computer 150 which recognizes the barcode of tag 142 and, employing a database 160, associates the user, wearing the tag 142, with a pre-designated user-specific egress floor, such as the floor on which the user lives.

Figure 4C:
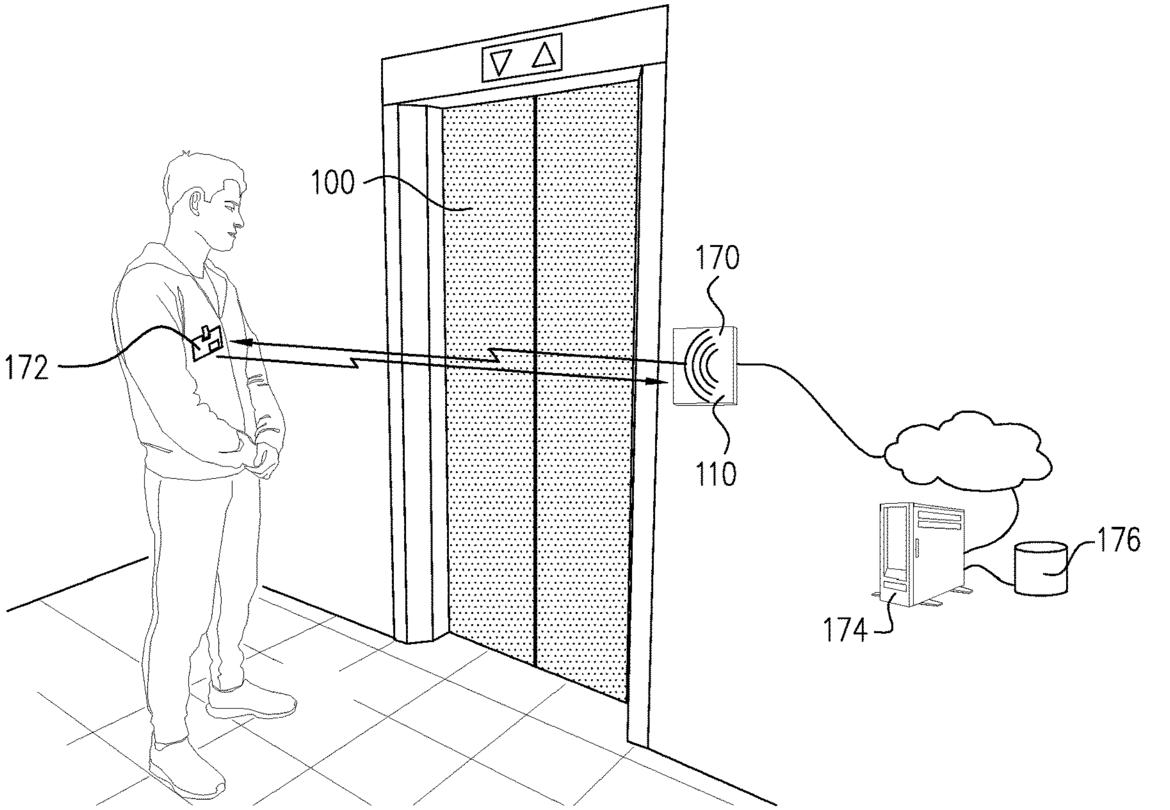

As seen in FIG. 4C, a further alternative user presence sensor 110 may be an RFID communicator 170, which reads an RFID tag 172 worn by a user. In such a case, the output of the communicator may be supplied to a computer 174 which recognizes the tag 172 and, employing a database 176, associates the user, wearing the tag 172, with a pre-designated user-specific egress floor, such as the floor on which the user lives. The RFID tag 172 may be an active or passive RFID tag.

It is appreciated that any other suitable user presence sensor 110 may alternatively be employed. It is also appreciated that alternatively, the user presence sensor need not provide designation of a user-specific egress floor. In such a case, the elevator will automatically stop at one or more pre-designated egress floors, such as the ground floor.

Figure 4D:
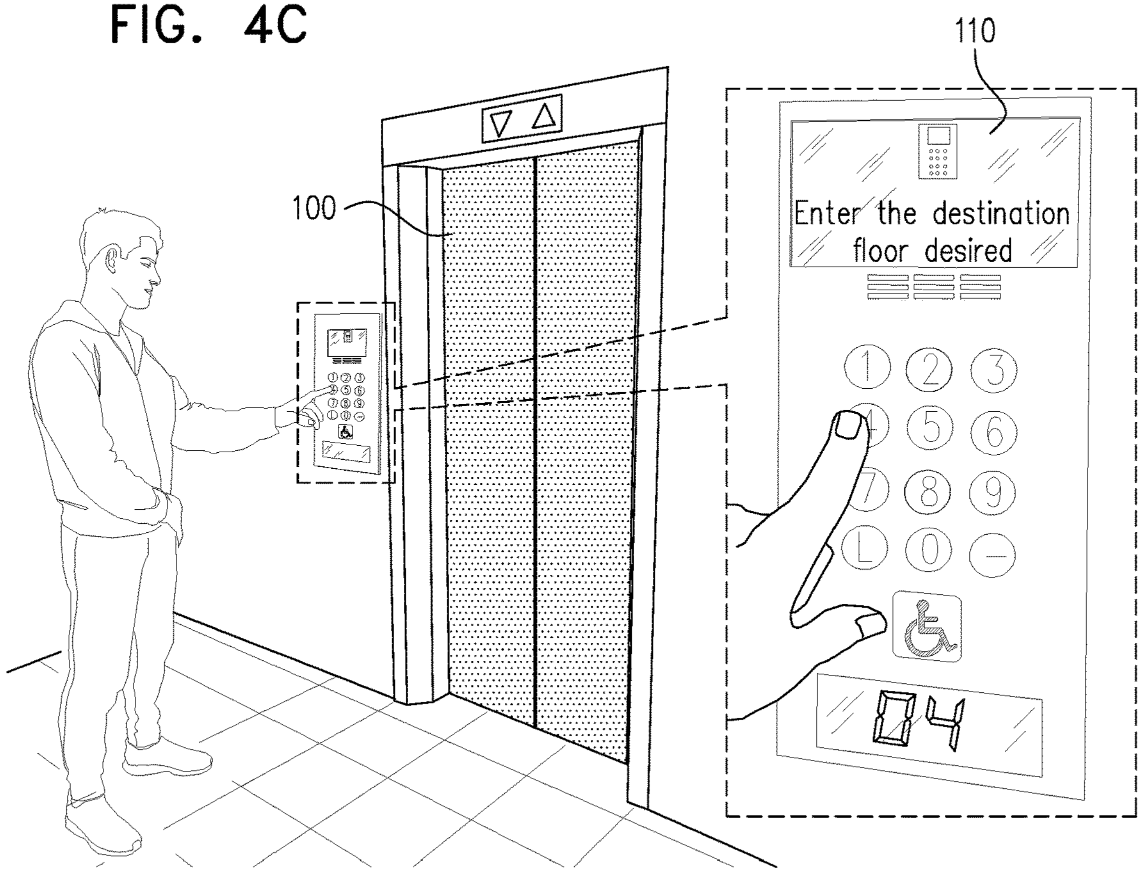

Optionally, as seen in FIG. 4D, yet another user presence sensor 110 may be a conventional elevator floor selector, which is normally not used by Sabbath observing users on the Sabbath but may be used by non-Sabbath observing users. In such a case, the output of the floor selector may designate a user-specific egress floor in a conventional manner.

Figure 1A:
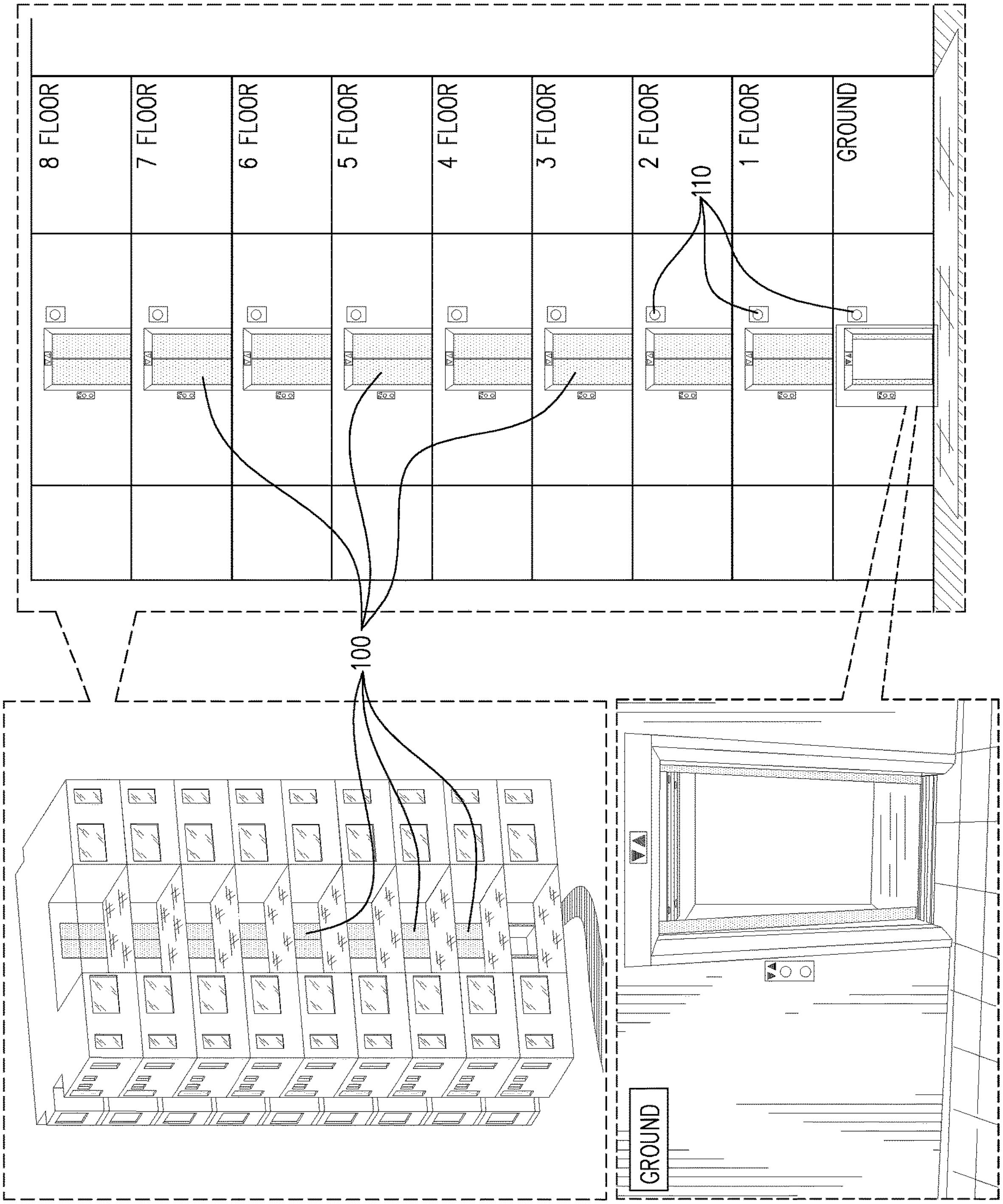
FIGS. 1A-1H are together a simplified pictorial illustration of the operation an elevator constructed and operative in accordance with a preferred embodiment of the present invention.
Figure 1B:
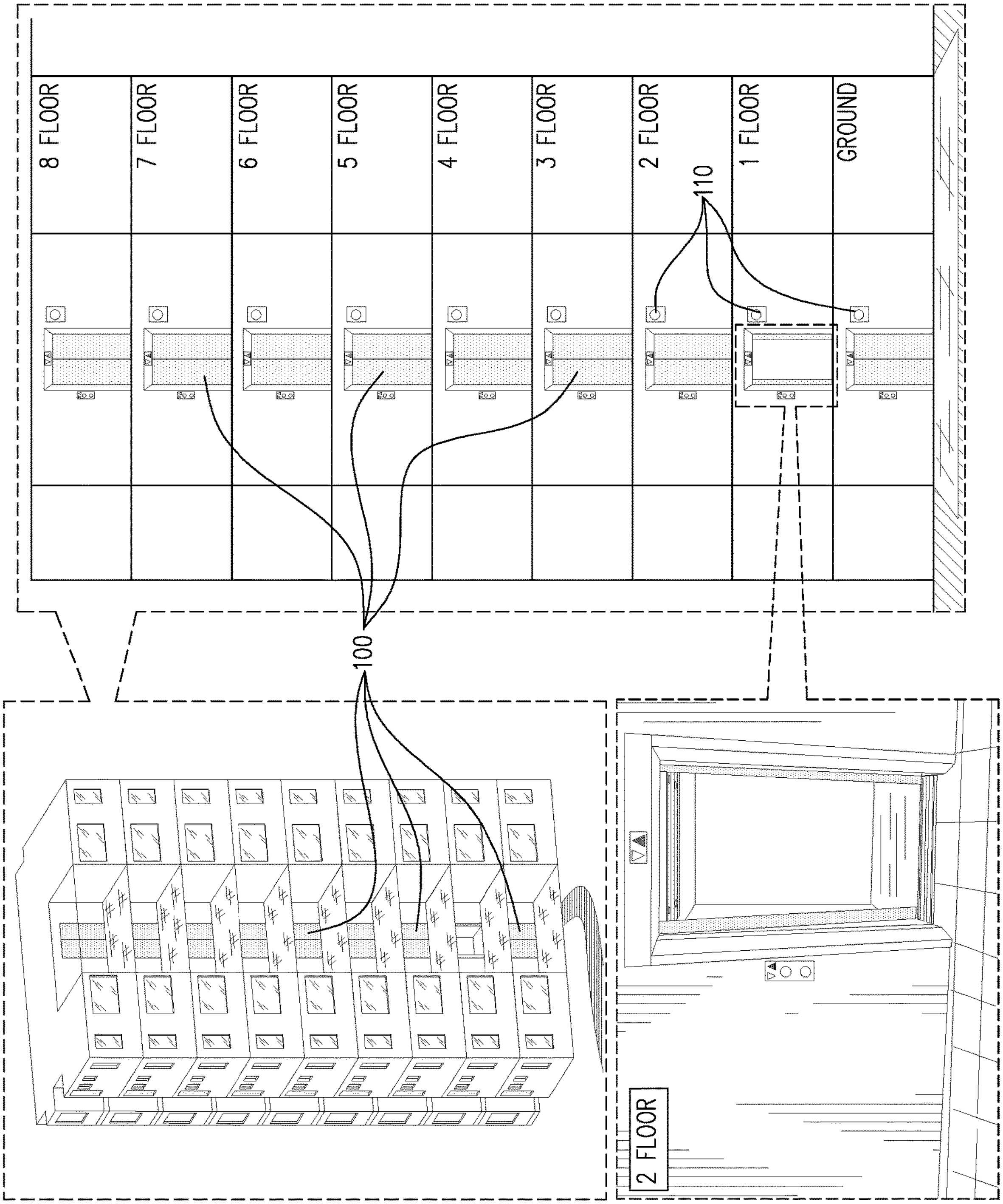
Figure 1C:
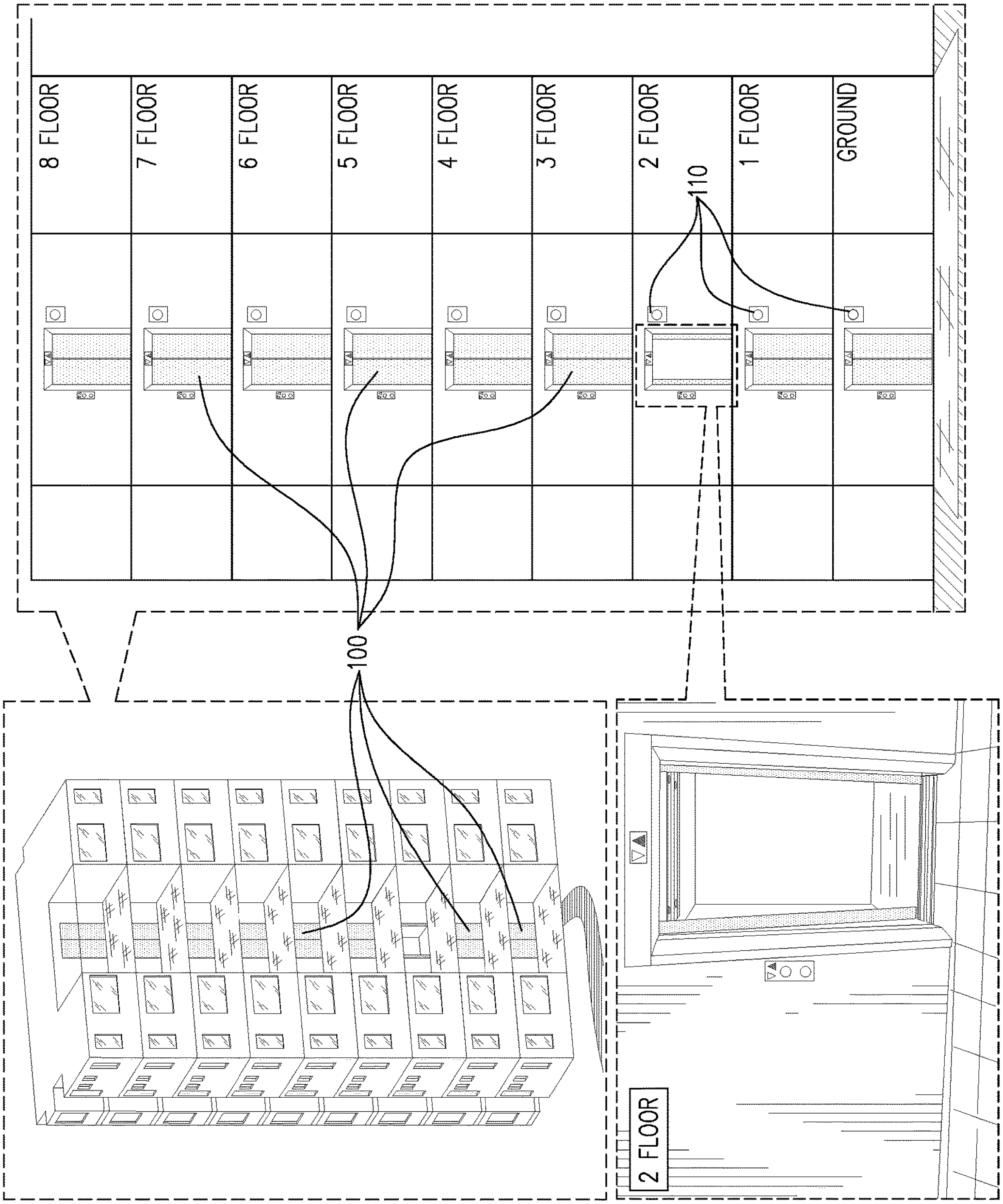

Returning now to FIGS. 1A-1H and 5, it is seen that in the absence of a sensed user, the elevator system stops at each sequential floor, opens the elevator doors, waits with the elevator doors open and then closes the elevator doors. The elevator operation takes place in accordance with main routine "A" shown in FIG. 5 and also performs the subroutine "B" shown in FIG. 5 and is illustrated in FIGS. 1A, 1B and 1C.

Figure 1D:
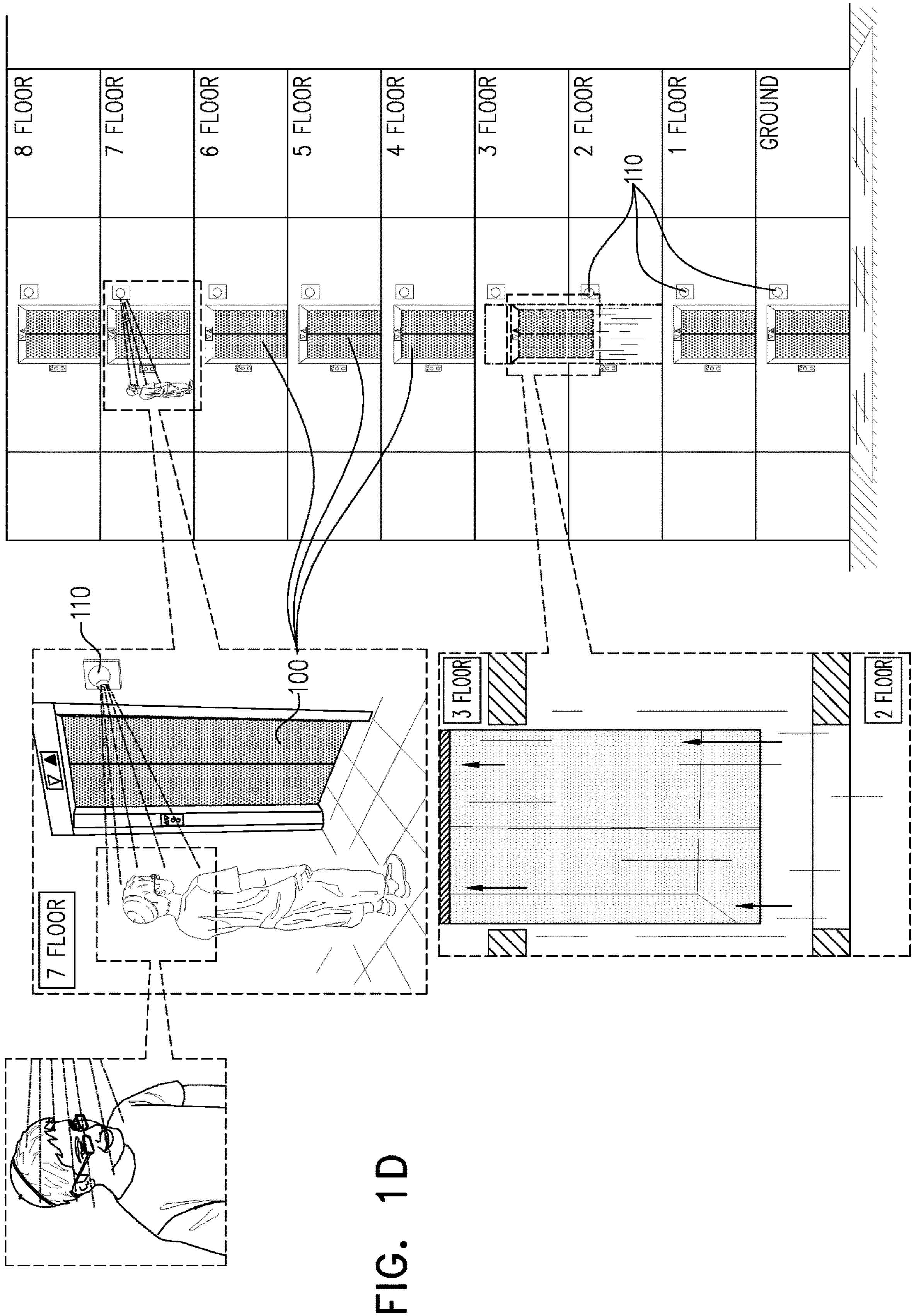

FIG. 1D shows sensing of the presence of a user on the seventh floor, while the elevator car is between the second and the third floors. In accordance with an embodiment of the present invention, upon sensing the presence of a user on the seventh floor, the elevator car proceeds directly to the seventh floor in accordance with the main routine "A" in FIG. 5. As it passes the third, fourth, fifth and sixth floors, it omits subroutine "B" at each floor in order to save time.

Figure 1E:
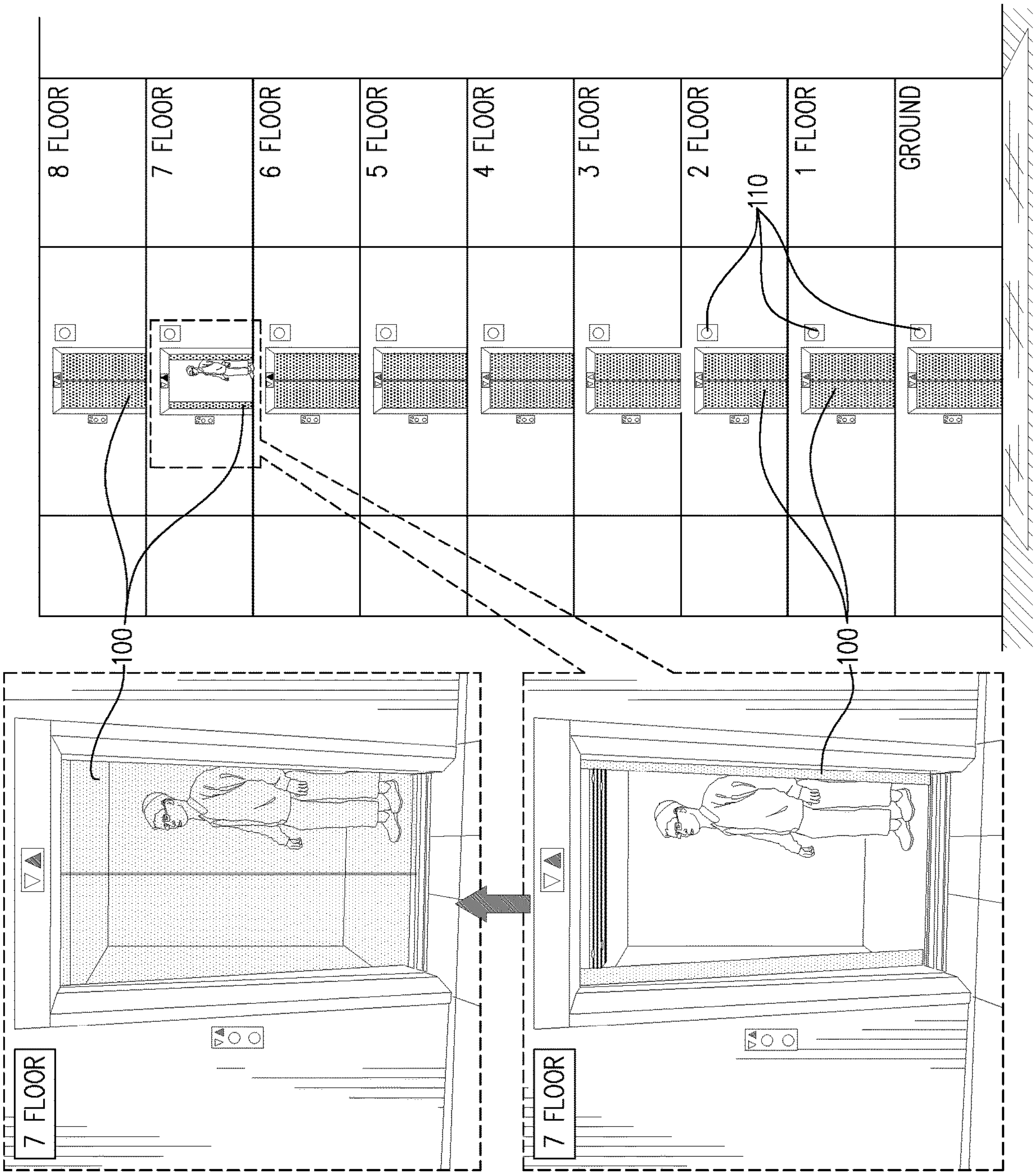

FIG. 1E shows that when the elevator car reaches the seventh floor, the "given floor" referenced in FIG. 5, it performs subroutine "B" at the seventh floor, allowing the user to enter the elevator car.

Figure 1F:
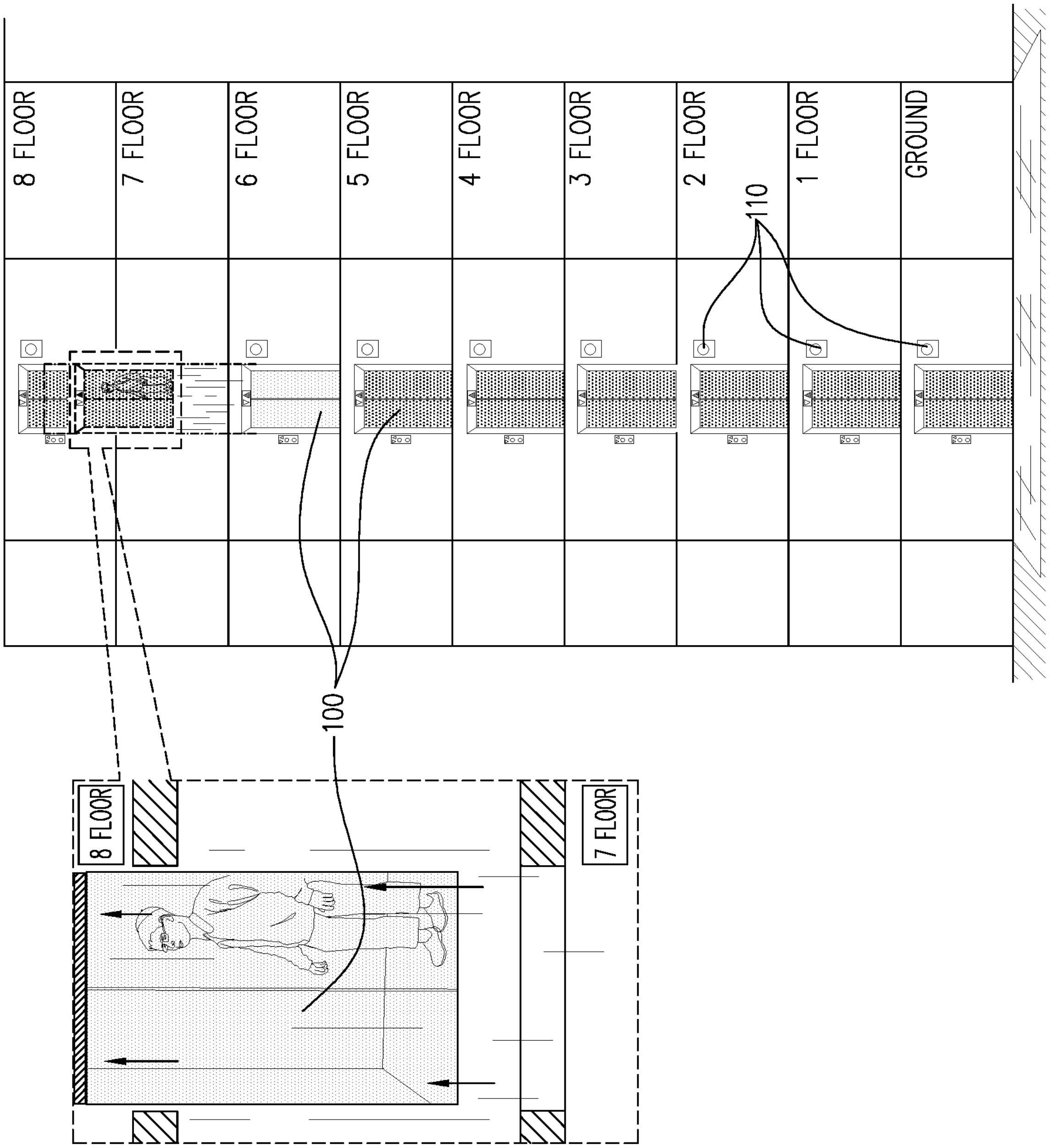

FIG. 1F shows that the elevator car proceeds to the eighth floor in accordance with the main routine "A" but omits subroutine "B" at the eighth floor.

Figure 1G:
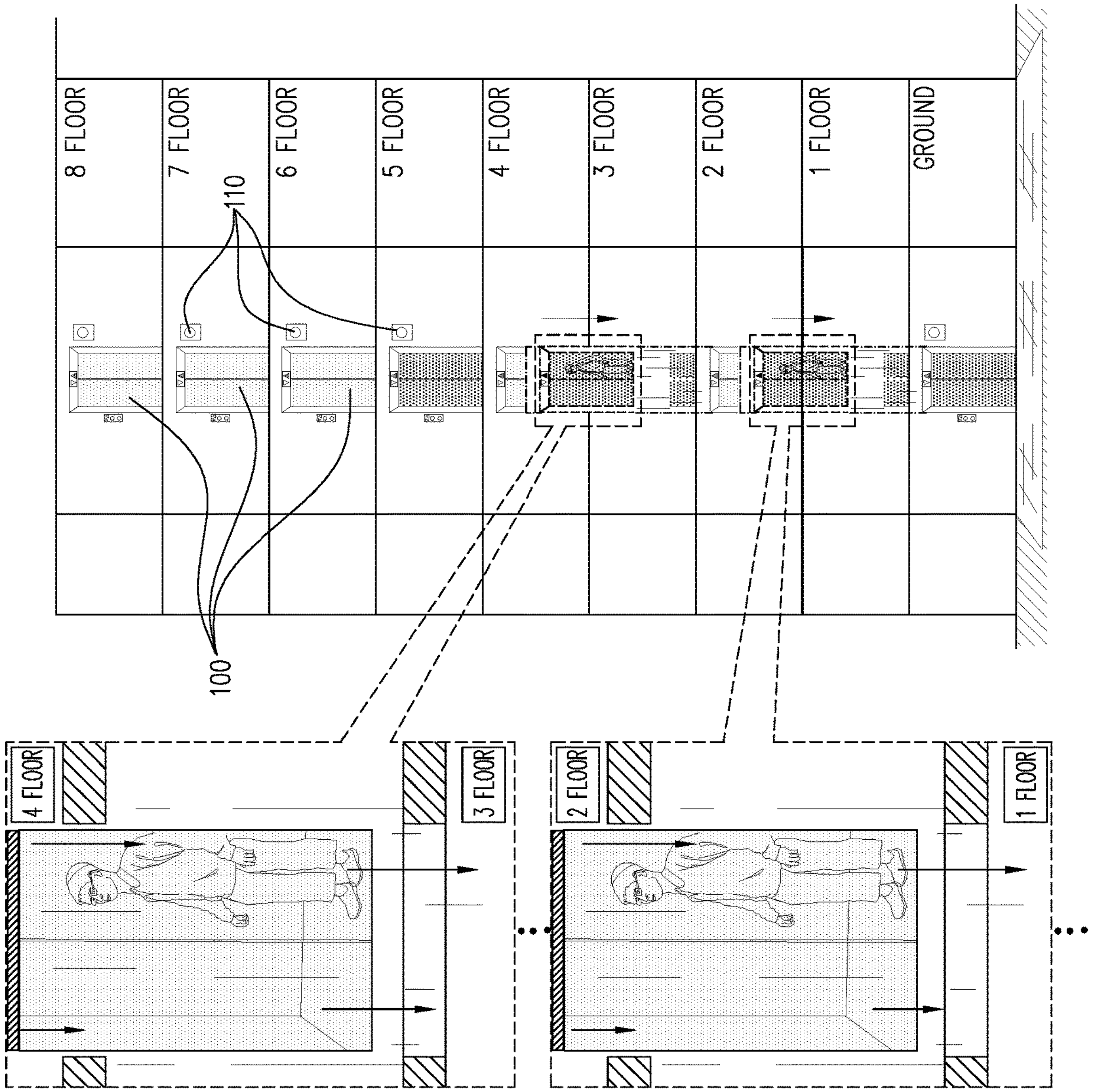

FIG. 1G shows that the elevator car descends from the eighth floor but omits subroutine "B" at each floor until it reaches the ground floor.

Figure 1H:
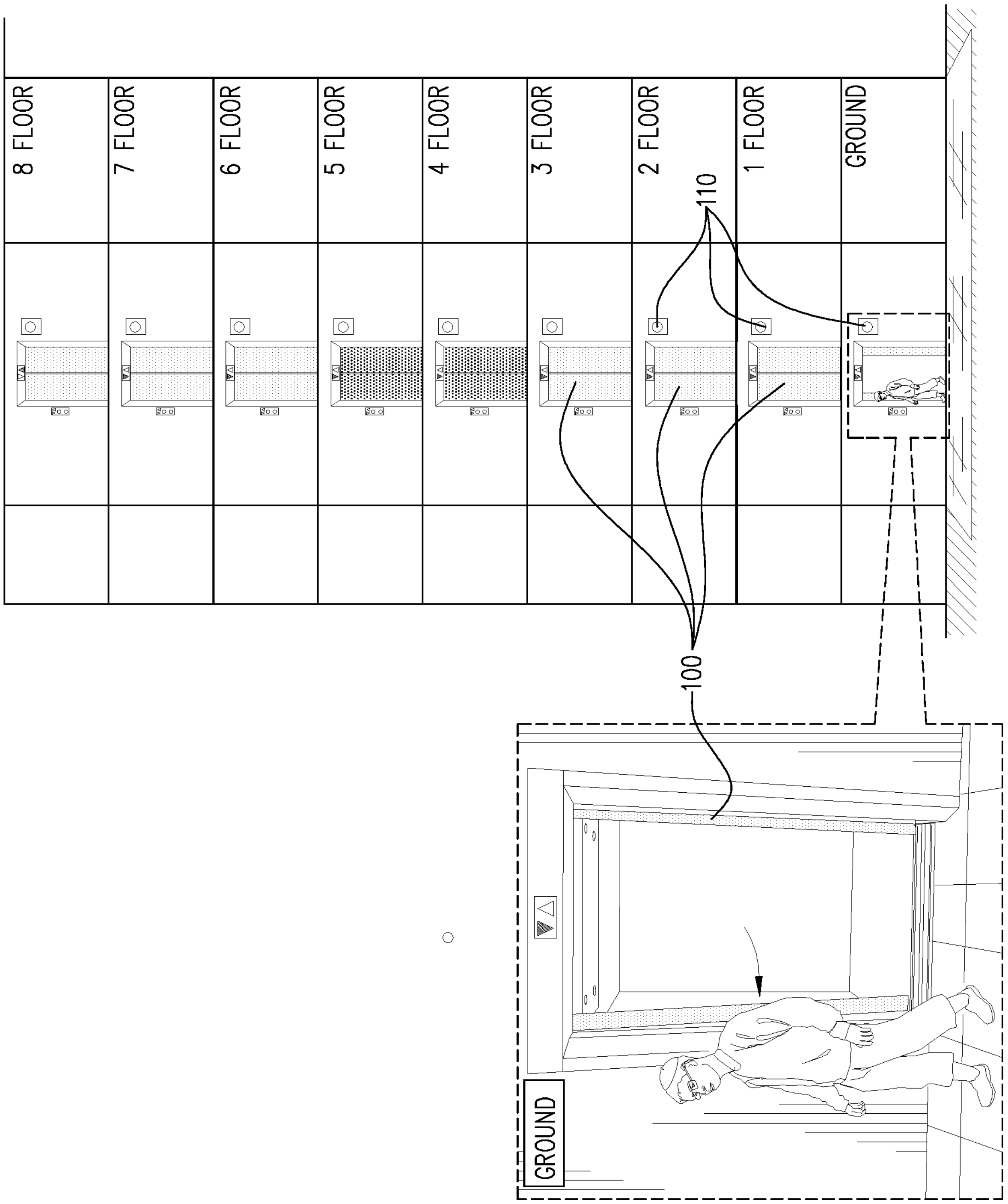

FIG. 1H shows that when the elevator car reaches the ground floor, it performs subroutine "B" and thus allows egress of the user.

It is appreciated that the embodiment of FIGS. 1A-1H need not provide designation of a user-specific egress floor. In such a case, the elevator will automatically stop at one or more pre-designated egress floors, such as the ground floor.

Figure 6A:
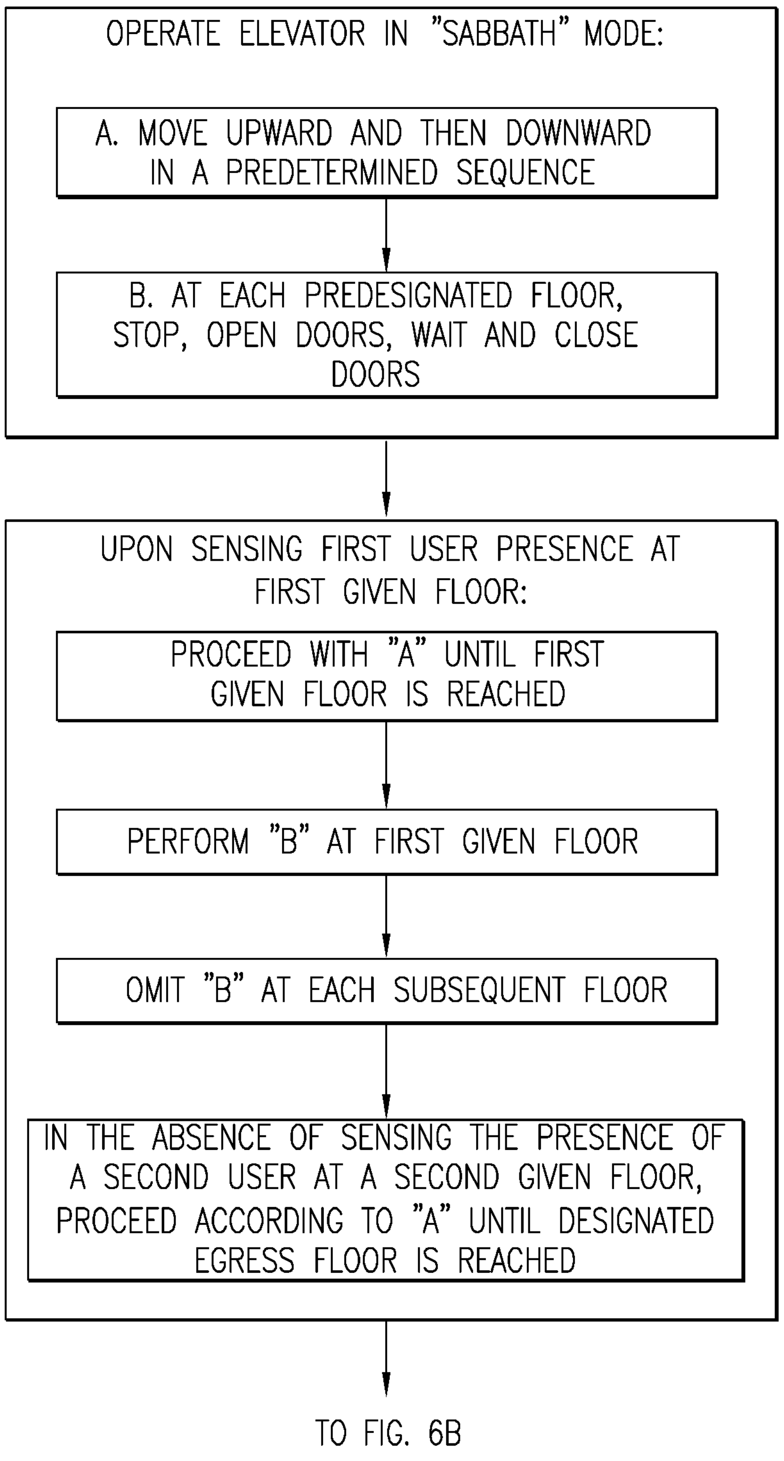
FIGS. 6A and 6B, are, taken together, a simplified flow chart illustrating the operation of the elevator shown in FIGS. 2A-2K.
Figure 6B:
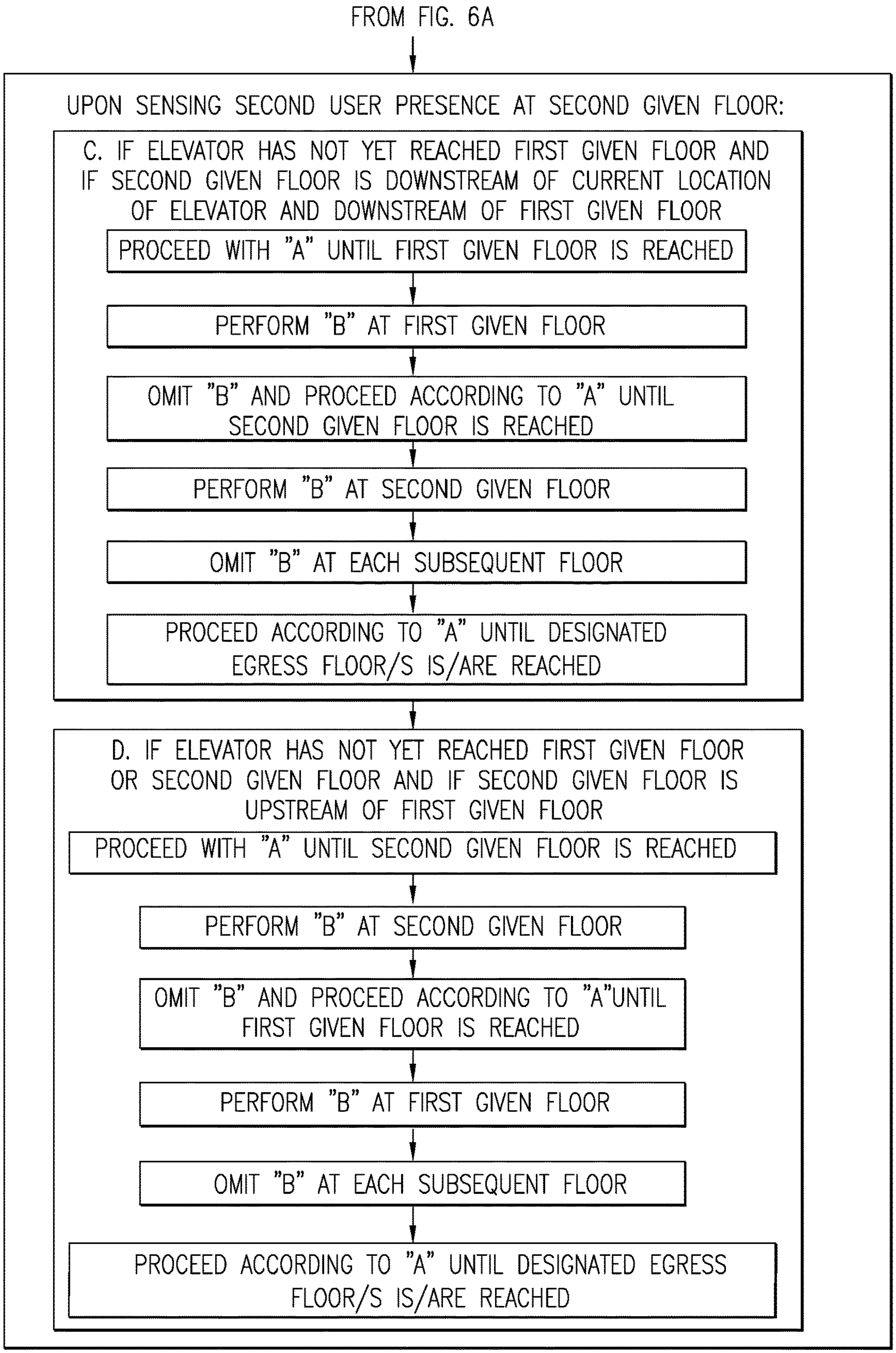

Reference is now made to FIGS. 2A-2K and to FIGS. 6A and 6B, which illustrate an elevator system, an elevator control and elevator operation in accordance with another preferred embodiment of the present invention. This embodiment also relates to an improvement in conventional operation of an elevator in a Sabbath mode, which conventional operation involves pre-programmed movement and operation of the elevator, typically in the following sequence:

The elevator goes up from a base floor, stopping at predesignated floors. At each floor at which the elevator stops, the elevator doors are opened and kept open for a predesignated time duration and then closed. The elevator then moves up to the next predesignated floor. When the elevator reaches the highest designated floor, it moves downward to one or more predesignated floors. It is appreciated that the predesignated floors may be every floor or only some floors. It is also appreciated that the same or different floors may be designated floors during upward movement of the elevator and downward movement of the elevator.

As seen in FIGS. 2A-2K, there is shown a typical building having a ground floor and 8 floors above the ground floor. An elevator is provided and has a selectably openable door 100 at each floor. A user presence sensor 110 is provided in the vicinity of each selectably openable door 100 for sensing the presence of a user. User presence sensor 110 may be one of a number of possible sensors as described hereinabove with reference to FIGS. 4A-4D.

Figure 2A:
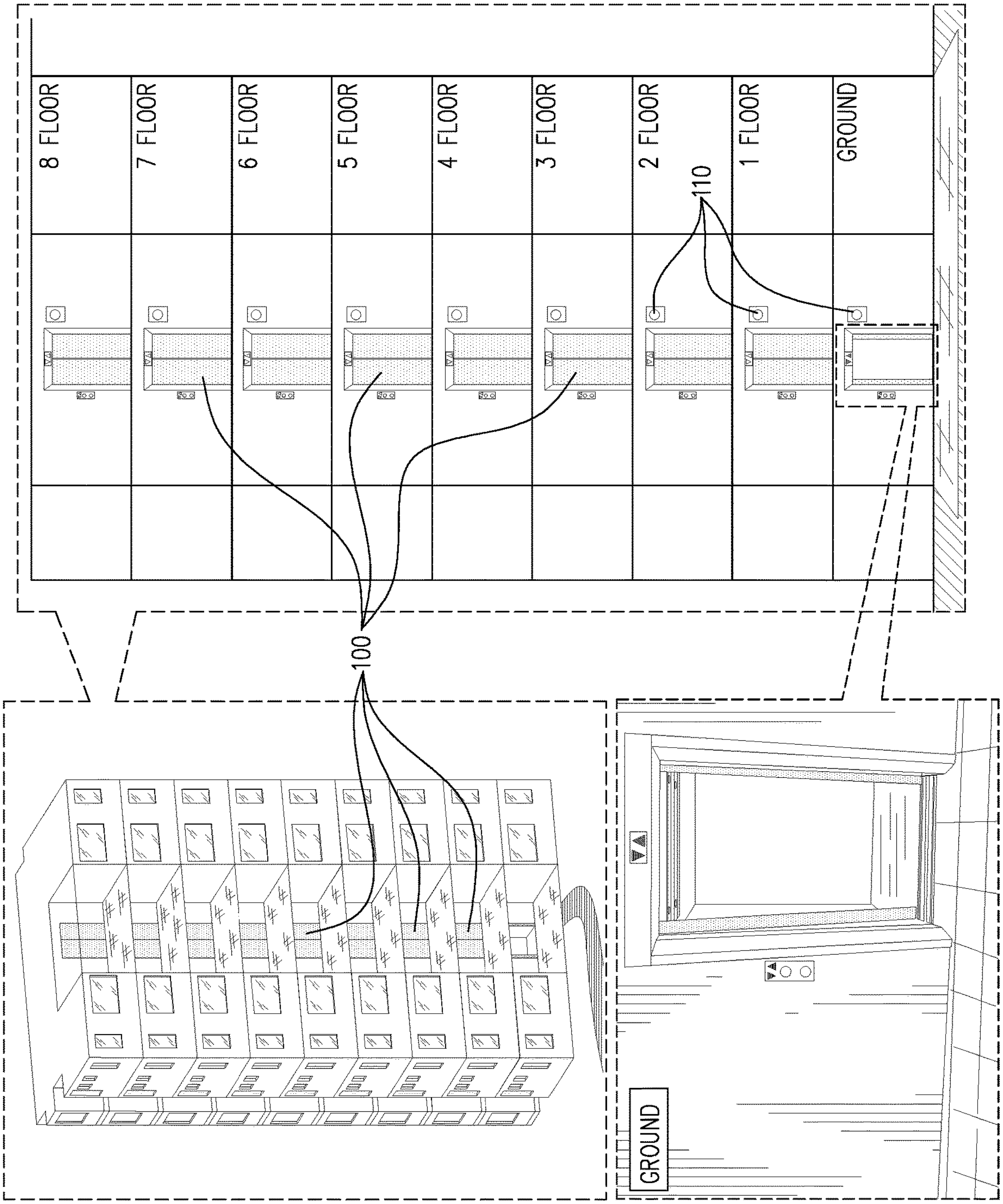
FIG. 2A-2K are together a simplified pictorial illustration of the operation an elevator constructed and operative in accordance with another preferred embodiment of the present invention.
Figure 2B:
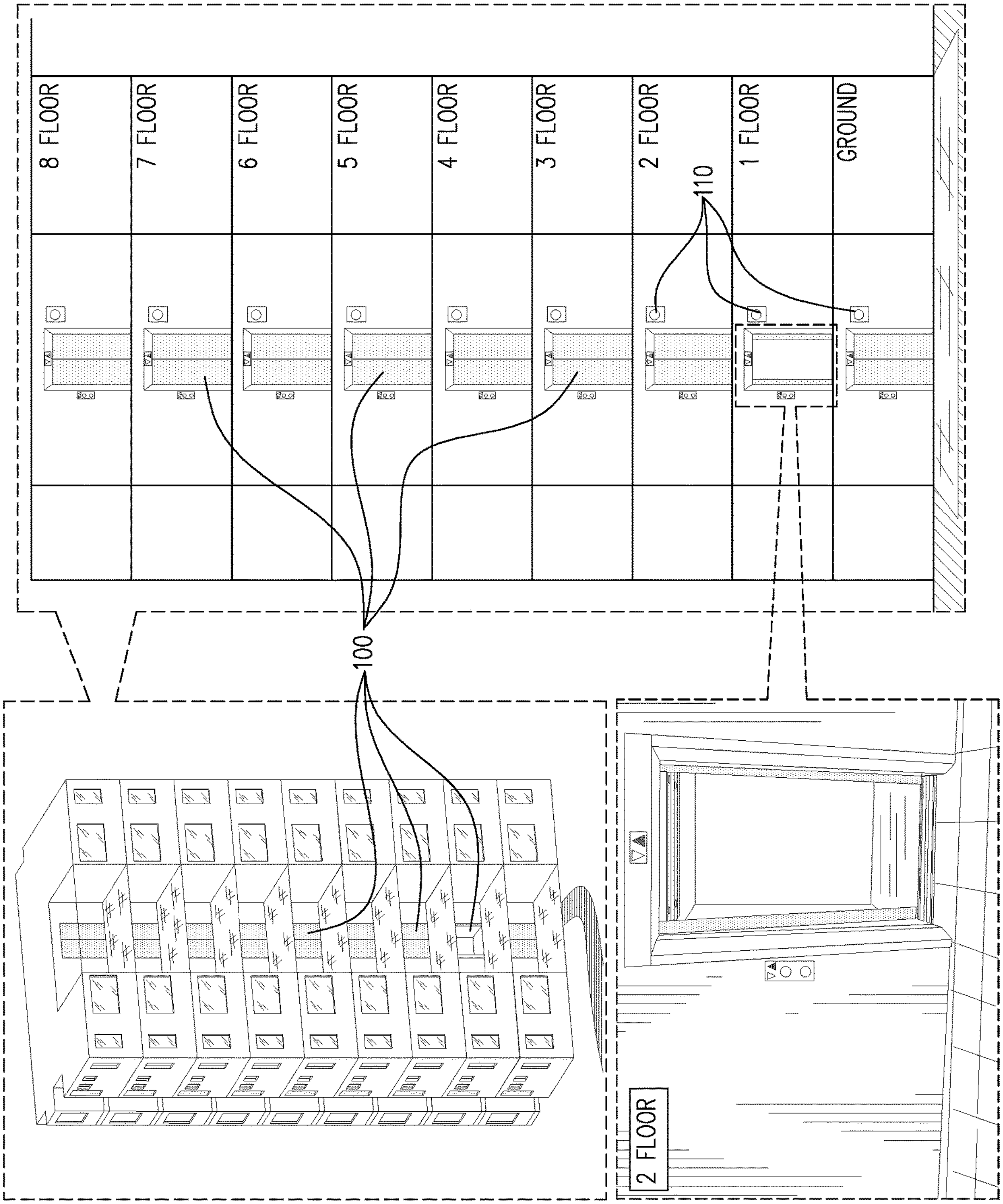
Figure 2C:
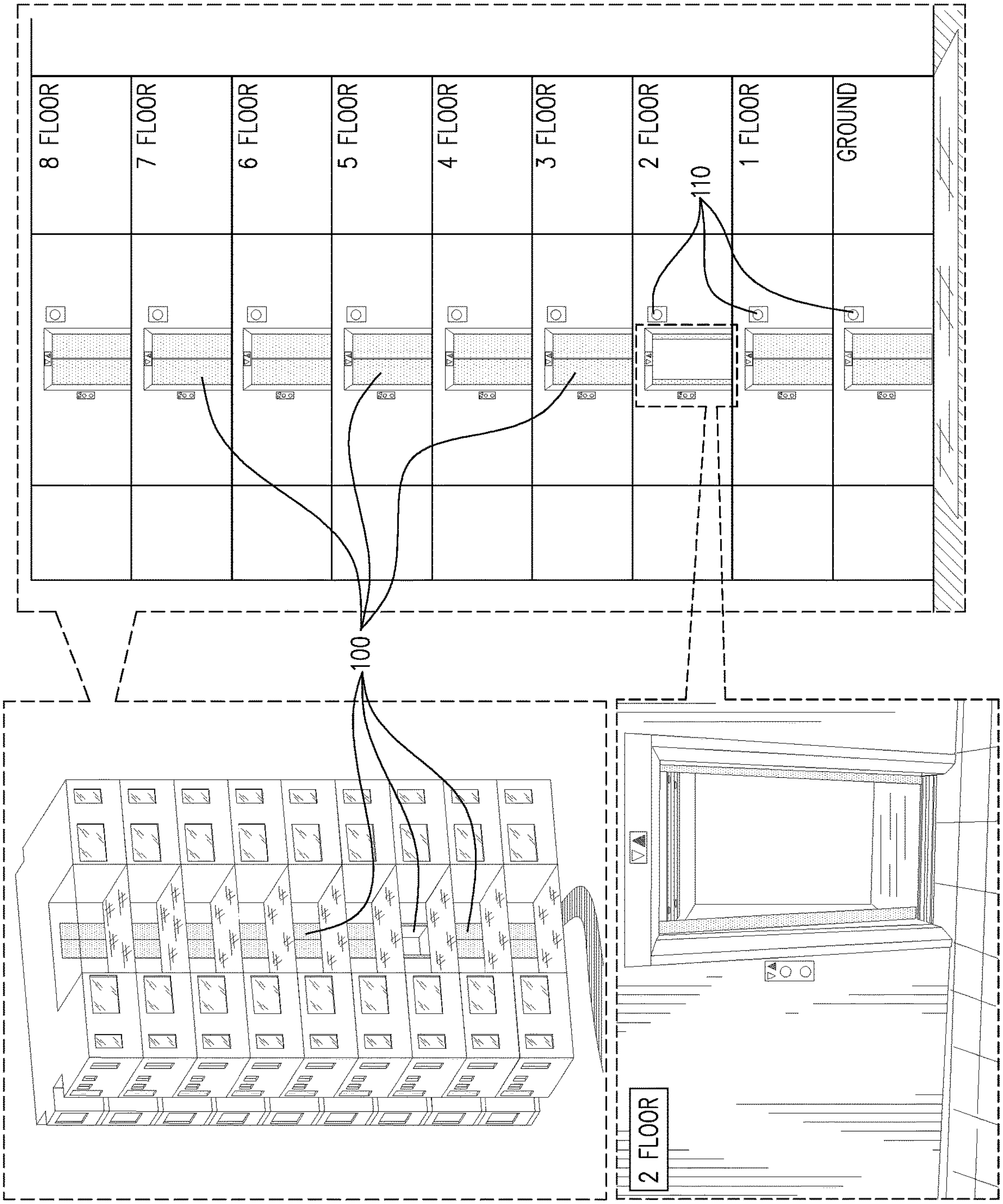

It is seen that in the absence of a sensed user, the elevator system stops at each sequential floor, opens the elevator doors, waits with the elevator doors open and then closes the elevator doors. The elevator operation takes place in accordance with main routine "A" shown in FIG. 6A and also performs the subroutine "B" shown in FIG. 6A and is illustrated in FIGS. 2A, 2B and 2C.

Figure 2D:
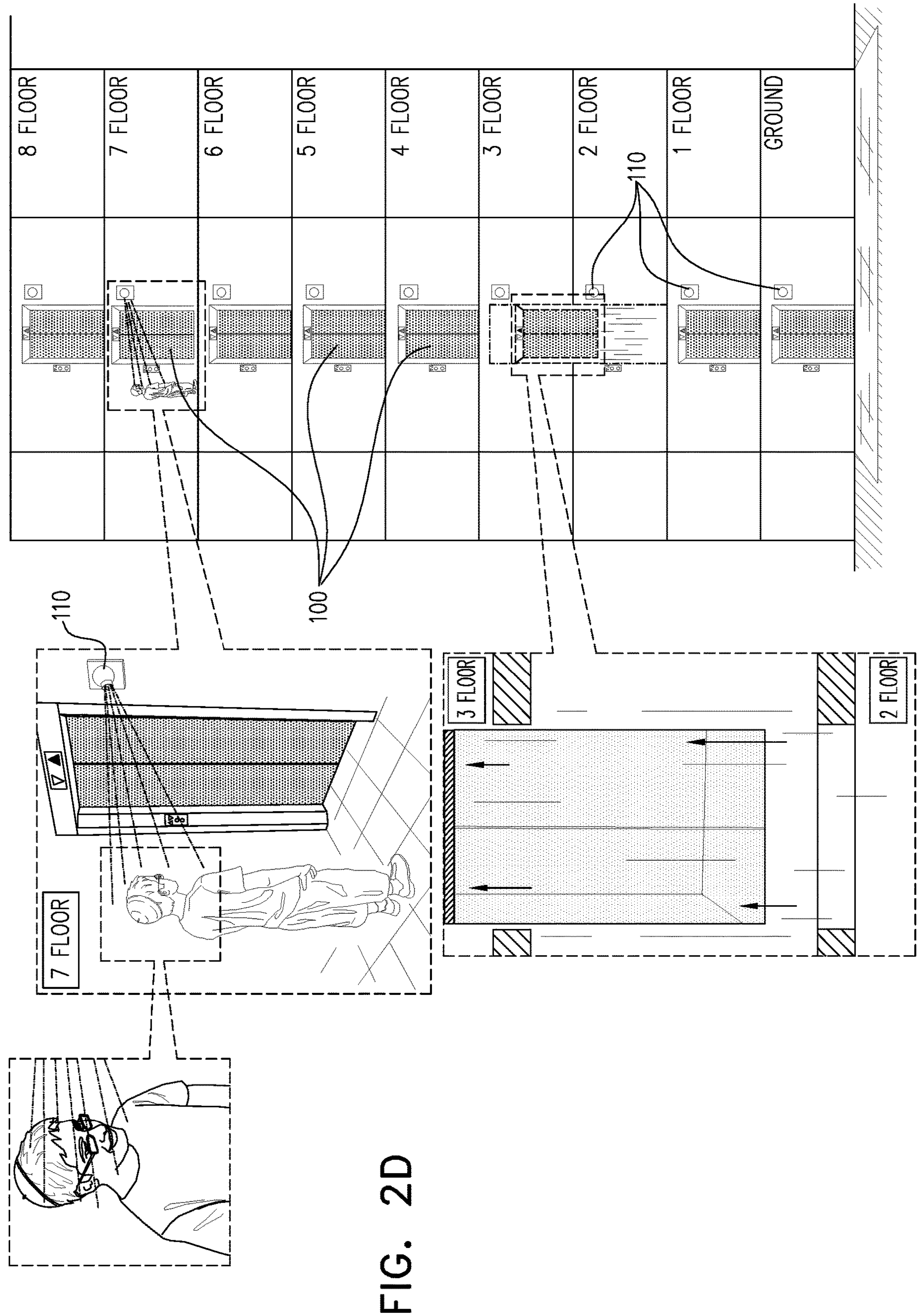

FIG. 2D shows sensing of the presence of a user on the seventh floor, while the elevator car is between the second and the third floors. In accordance with an embodiment of the present invention, upon sensing the presence of a user on the seventh floor, the elevator car proceeds directly to the seventh floor in accordance with the main routine "A" in FIG. 6A. As it passes the third, fourth and fifth floors, it omits subroutine "B" at each floor in order to save time.

Figure 2E:
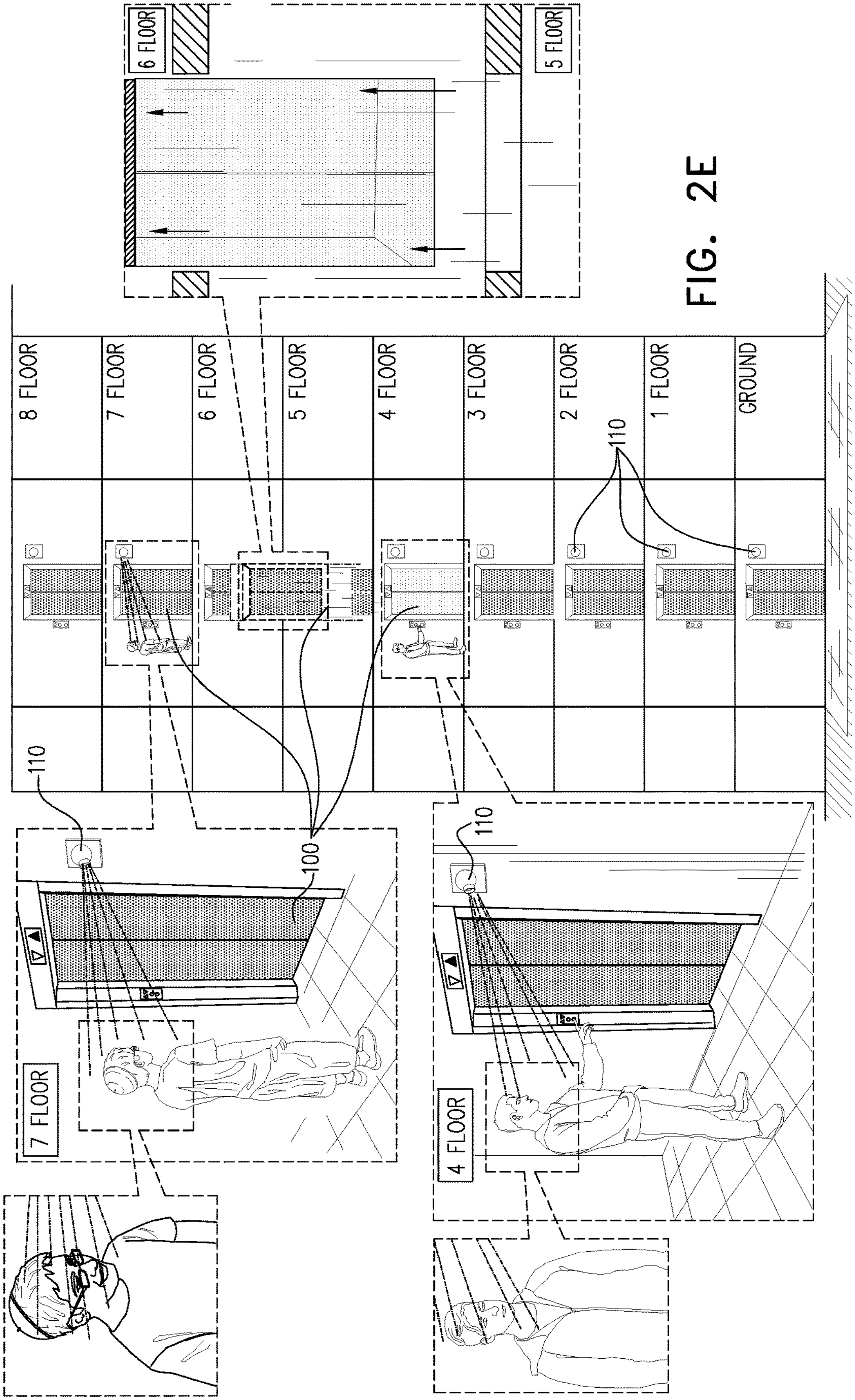

FIG. 2E shows that when the elevator car reaches the sixth floor, a second user, who has employed a conventional floor selection switch, is sensed at the fourth floor. The elevator omits subroutine "B" at the sixth floor and proceeds to the seventh floor.

Figure 2F:
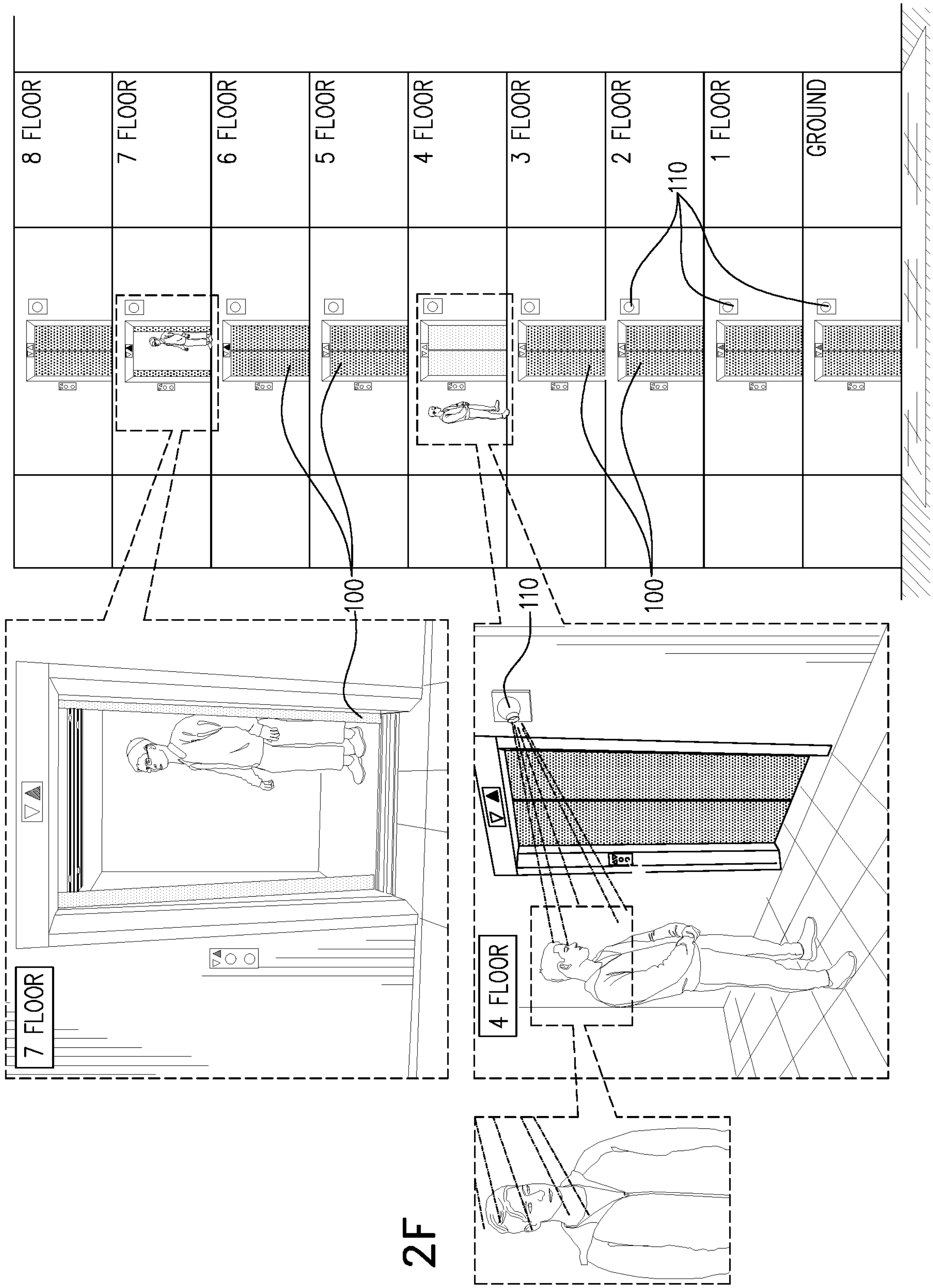

FIG. 2F shows that when the elevator car reaches the seventh floor, the "first given floor" referenced in step C of FIG. 6B, it performs subroutine "B" at the seventh floor, allowing the first user to enter the elevator car.

Figure 2G:
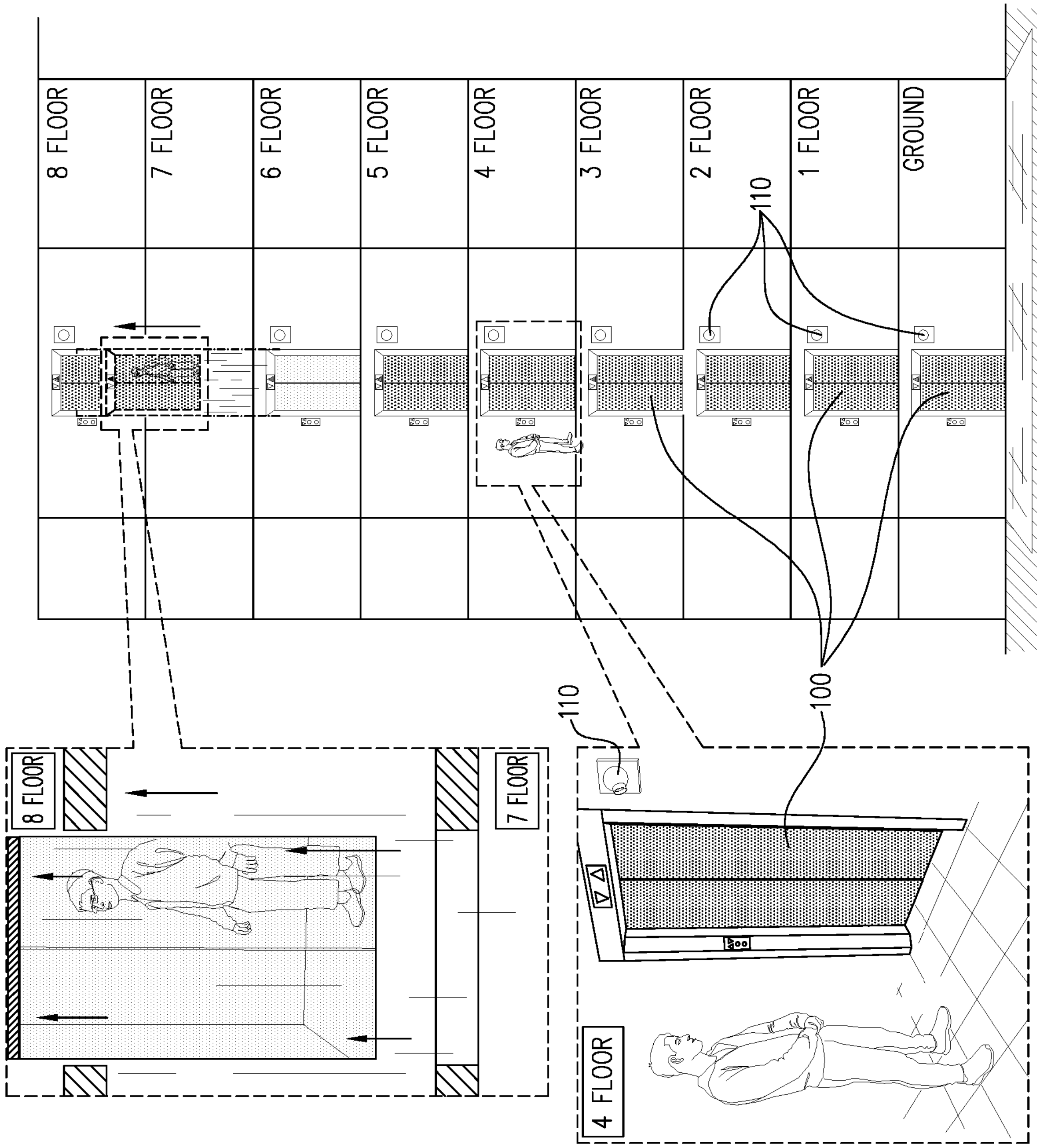

FIG. 2G shows that the elevator car then proceeds to the eighth floor in accordance with the main routine "A" but omits subroutine "B" at the eighth floor.

Figure 2H:
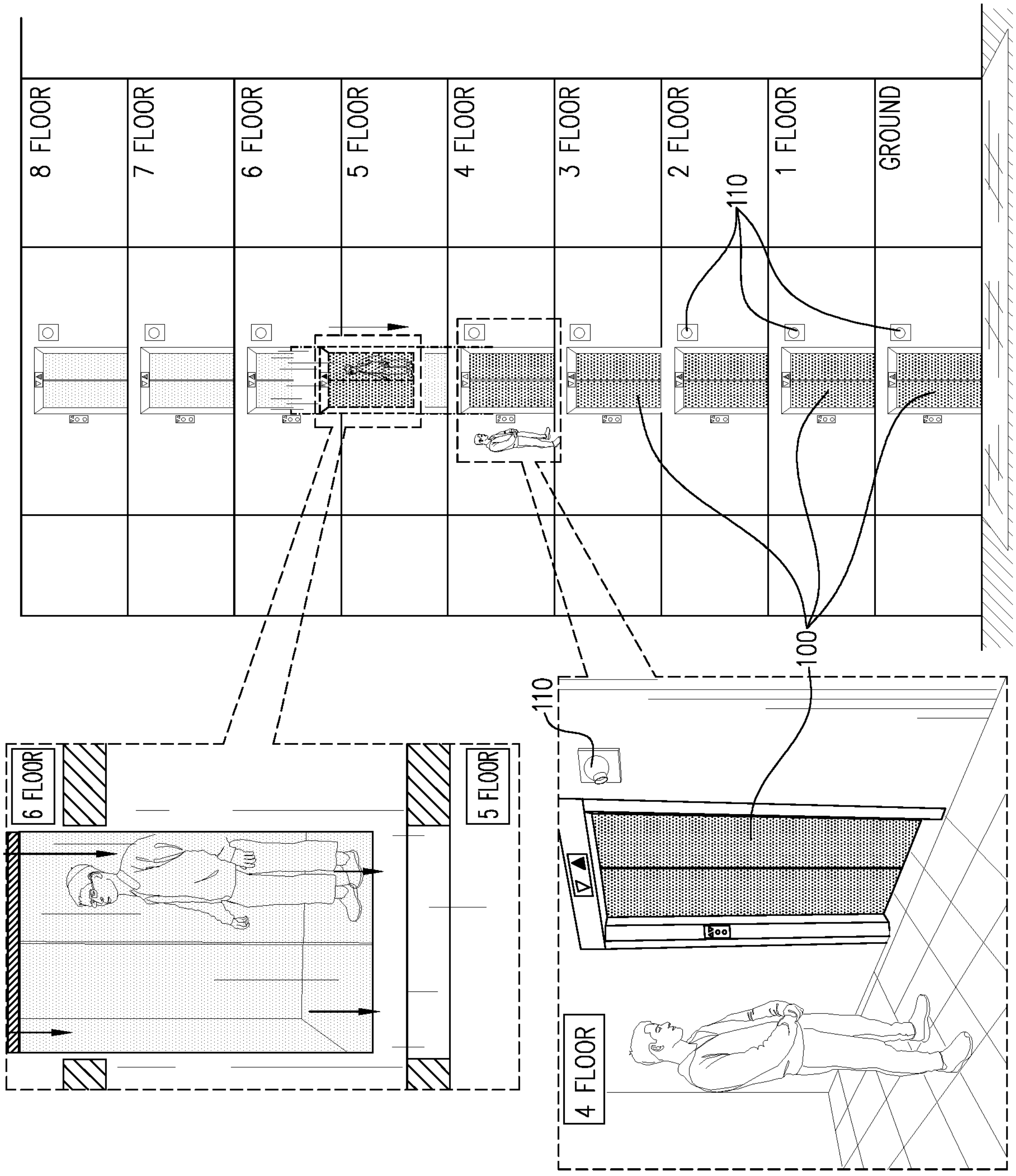

FIG. 2H shows that the elevator car descends from the eighth floor but omits subroutine "B" at each floor until it reaches the fourth floor.

Figure 2I:
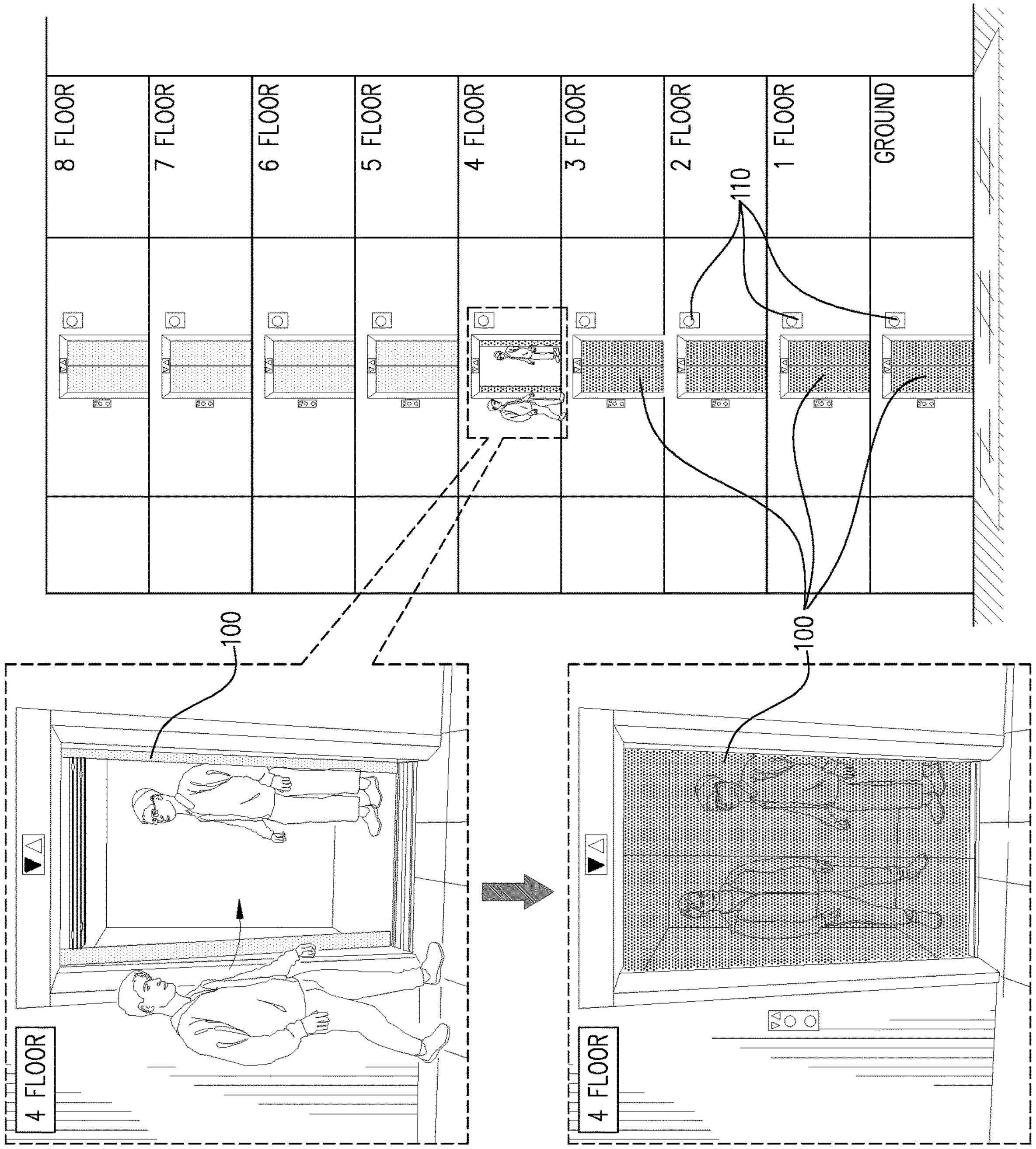

FIG. 2I shows that when the elevator car reaches the fourth floor, it performs subroutine "B" and thus allows the second user to enter the elevator car.

Figure 2J:
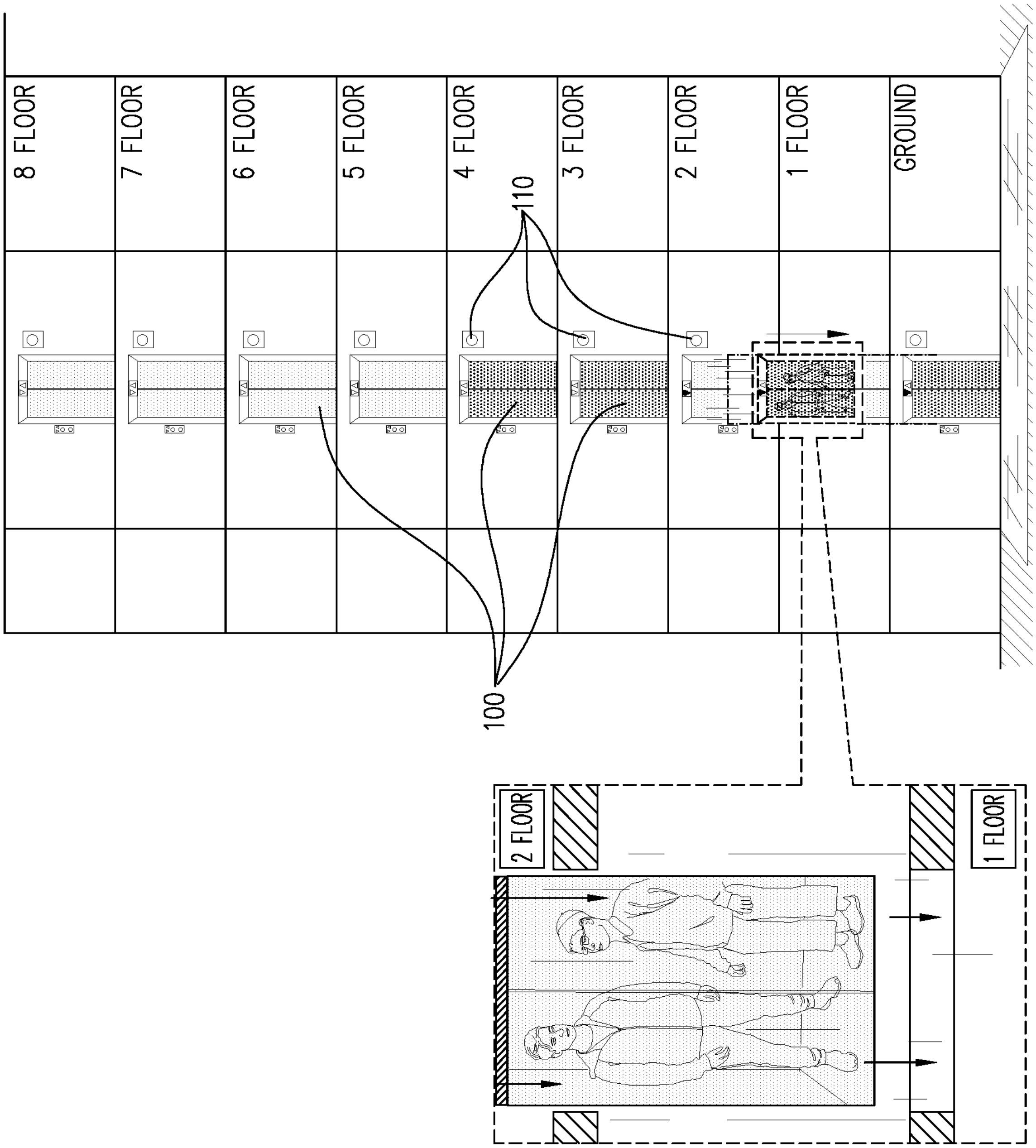

FIG. 2J shows that the elevator car descends from the fourth floor but omits subroutine "B" at each floor until it reaches the ground floor.

Figure 2K:
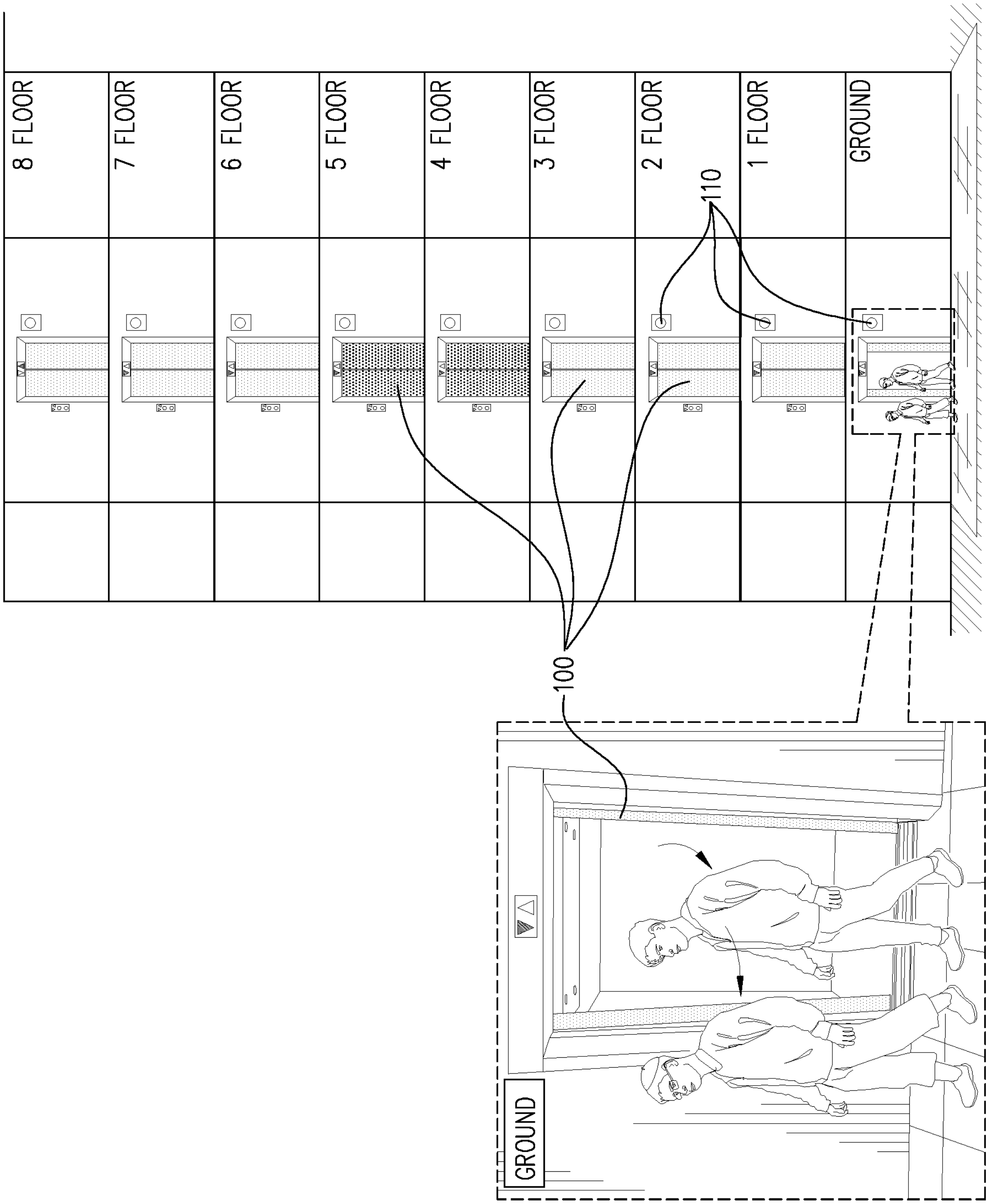

FIG. 2K shows that when the elevator car reaches the ground floor, it performs subroutine "B" and thus allows egress of the user.

It is appreciated that the embodiment of FIGS. 2A-2K need not provide designation of a user-specific egress floor. In such a case, the elevator will automatically stop at one or more pre-designated egress floors, such as the ground floor.

As seen in FIG. 6A, upon sensing a first user at a first given floor, the elevator proceeds according to routine "A" and omits subroutine "B" until it reaches the first given floor. After performing subroutine "B" at the first given floor, in the absence of sensing the presence of a second user, the elevator proceeds, as shown in FIG. 6A, according to routine "A" until reaching one or more pre-designated egress floors, such as the ground floor, where the elevator will automatically perform subroutine "B".

It is appreciated that in the event that the presence of a second user is sensed, at a second given floor, when the elevator car is already downstream of the second given floor on the way down to the one or more pre-designated egress floors, the elevator proceeds, as shown in FIG. 6A, according to routine "A" until reaching one or more pre-designated egress floors, such as the ground floor, where the elevator will automatically perform subroutine "B". Following the completion of routine "A", by the performance of subroutine "B" at the last predesignated egress floor, the elevator will then respond to the sensing of the presence of the second user, who will now be considered a first user, and proceeding as described above with reference to FIG. 6A.

As seen in step C in FIG. 6B, when the presence of a second user at a second given floor is sensed prior to the elevator car reaching the floor where the first user has been sensed, if the second given floor is above the first given floor or if the elevator car is already above the second given floor, then the elevator continues to proceed with routine "A" until reaching the floor where the first user has been sensed, as shown in the illustrated embodiment of FIGS. 2D-2K. As seen further in step C in FIG. 6B, upon reaching the first given floor, the elevator performs subroutine "B" at the first given floor and then proceeds with routine "A" until reaching the second given floor. The elevator performs subroutine "B" at the second given floor and then proceeds with routine "A" until reaching one or more pre-designated egress floors, such as the ground floor, where the elevator will automatically perform subroutine "B".

It is also appreciated that the above sequence, shown in step C of FIG. 6B, is also performed when the presence of a second user, at the second given floor, is sensed after the elevator car has reached the first given floor but has not yet reached the second given floor, at least on the way down to the one or more pre-designated egress floors.

If the presence of a second user is sensed, at the second given floor, prior to the elevator car reaching the first given floor and prior to reaching the second given floor, that the elevator continues to proceed with routine "A" until reaching the second given floor, where the second user has been sensed, as seen in step D in FIG. 6B. As seen further in step D in FIG. 6B, upon reaching the second given floor, the elevator performs subroutine "B" at the second given floor and then proceeds with routine "A" until reaching the first given floor. The elevator performs subroutine "B" at the first given floor and then proceeds with routine "A" until reaching one or more pre-designated egress floors, such as the ground floor, where the elevator will automatically perform subroutine "B".

Figure 7:
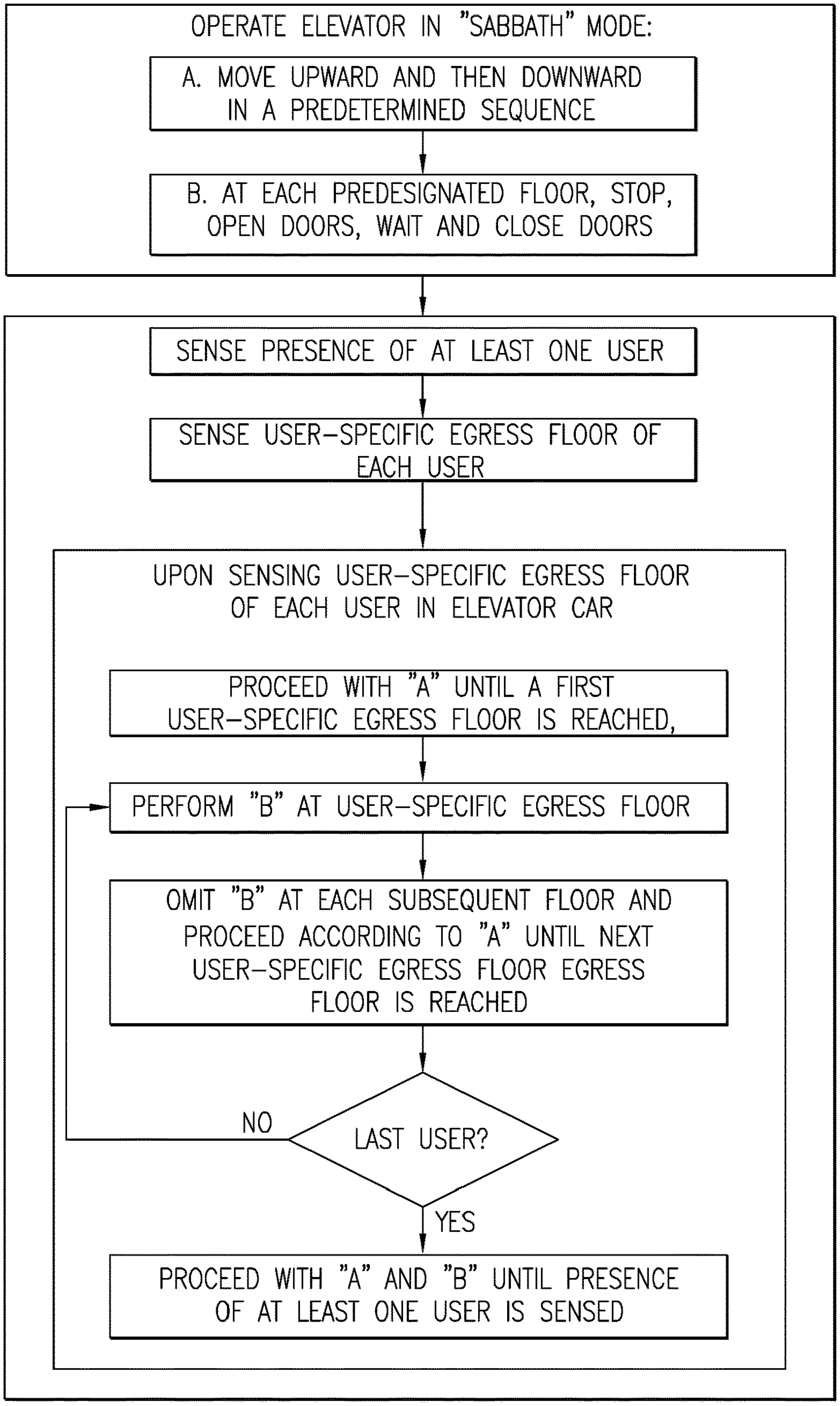
FIG. 7 is a simplified flow chart illustrating the operation of the elevator shown in FIGS. 3A-3K.

Reference is now made to FIGS. 3A-3K and to FIG. 7, which illustrate an elevator system, an elevator control and elevator operation in accordance with another preferred embodiment of the present invention. This embodiment also relates to an improvement in conventional operation of an elevator in a Sabbath mode, which conventional operation involves pre-programmed movement and operation of the elevator, typically in the following sequence:

The elevator goes up from a base floor, stopping at predesignated floors. At each floor at which the elevator stops, the elevator doors are opened and kept open for a predesignated time duration and then closed. The elevator then moves up to the next predesignated floor. When the elevator reaches the highest designated floor, it moves downward to one or more predesignated floors. It is appreciated that the predesignated floors may be every floor or only some floors. It is also appreciated that the same or different floors may be designated floors during upward movement of the elevator and downward movement of the elevator.

As seen in FIGS. 3A-3K, there is shown a typical building having a ground floor and 8 floors above the ground floor. An elevator is provided and has a selectably openable door 100 at each floor. A user presence sensor 110 is provided in the vicinity of each selectably openable door 100 for sensing the presence of a user. User presence sensor 110 may be one of a number of possible sensors as described hereinabove with reference to FIGS. 4A-4D.

In this example, as in the examples described above with reference to FIGS. 1A-2K, it is appreciated that in the absence of a sensed user, the elevator system stops at each sequential pre-designated floor, opens the elevator doors, waits with the elevator doors open and then closes the elevator doors. The elevator operation takes place in accordance with main routine "A" shown in FIG. 7 and also performs the subroutine "B" shown in FIG. 7.

Figure 3A:
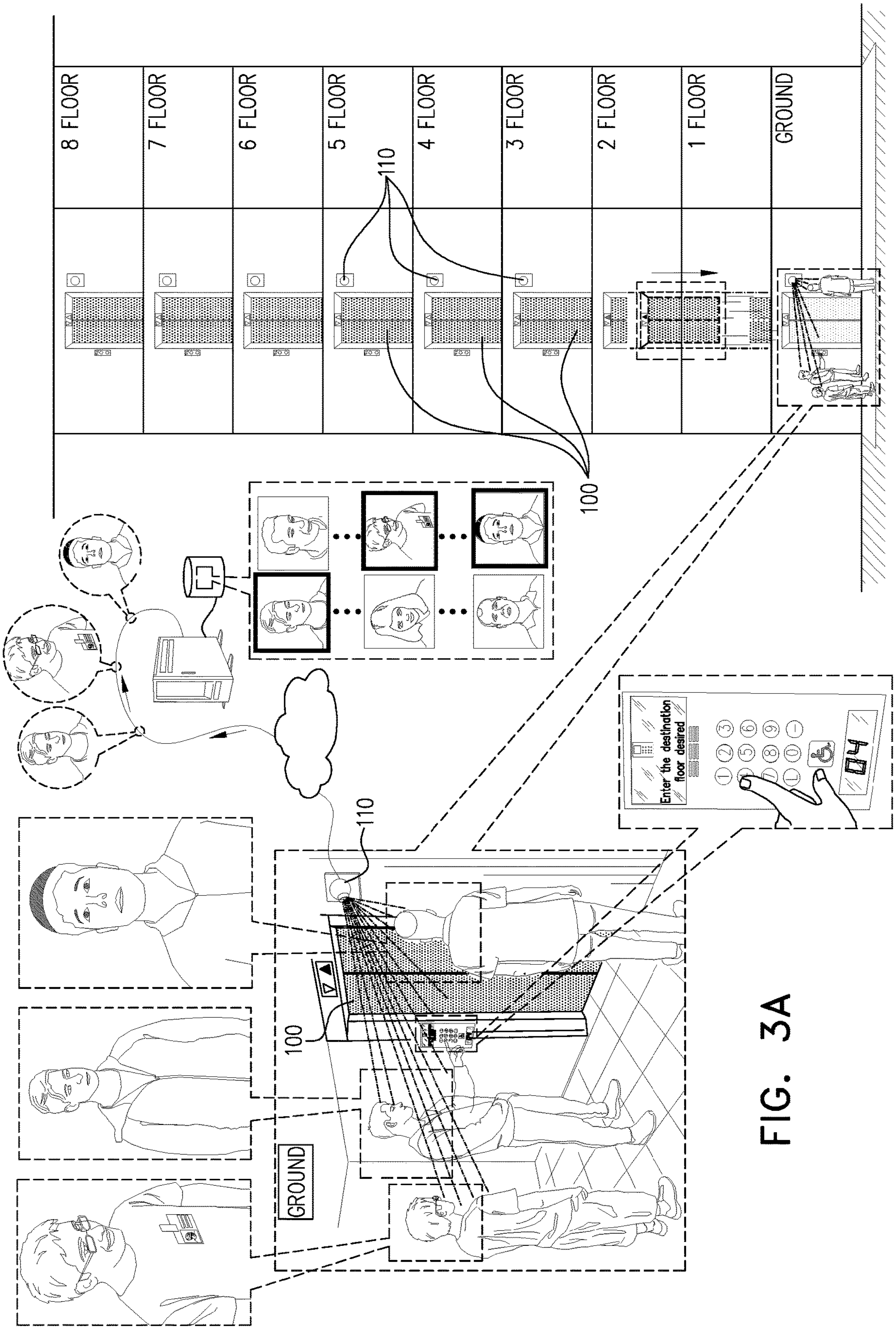
FIGS. 3A-3K are together a simplified pictorial illustration of the operation an elevator constructed and operative in accordance with another preferred embodiment of the present invention.

In this example, as seen in FIG. 3A, while the elevator car is descending, the presence of three individuals at the ground floor is sensed. A pre-designated egress floor of a first one of the individuals is sensed by face recognition, as explained hereinabove with reference to FIG. 4A, a pre-designated egress floor of a second one of the individuals is sensed by bar code reading or RFID tag reading, as explained hereinabove with reference to FIG. 4B or FIG. 4C, and a pre-designated egress floor of a third one of the individuals is sensed by operation of a egress floor selection switch, as explained hereinabove with reference to FIG. 4D.

Figure 3B:
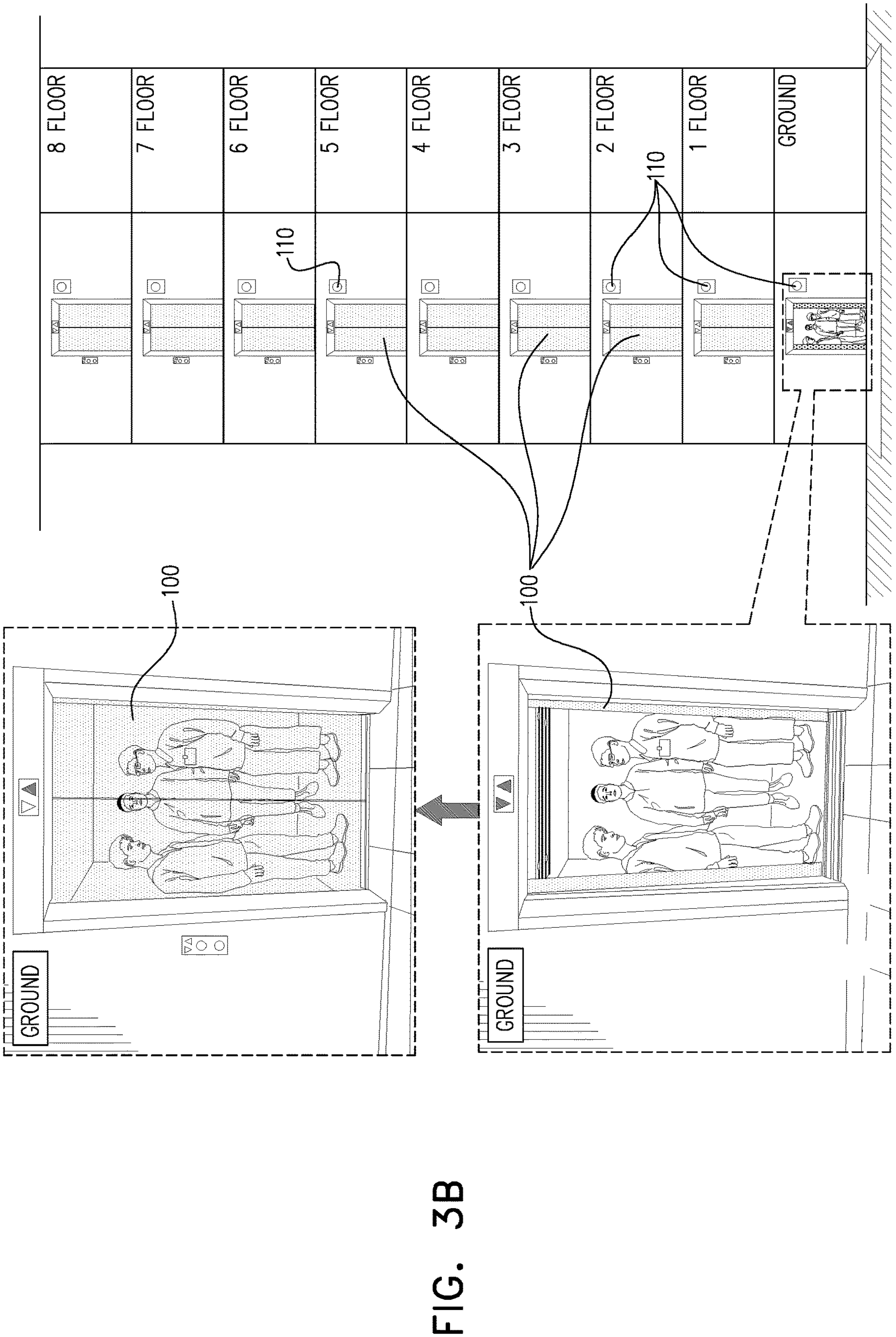
Figure 3C:
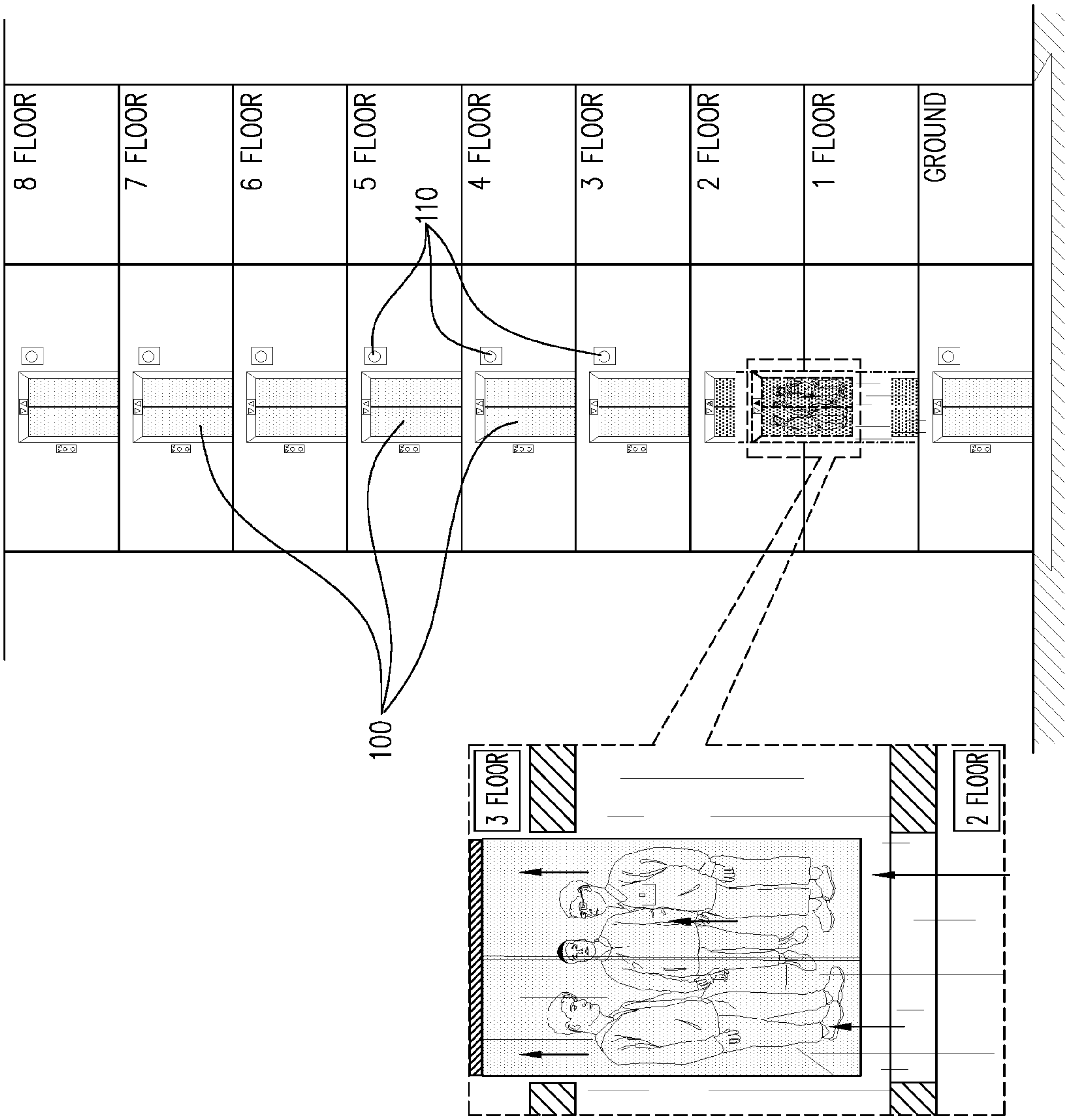
Figure 3D:
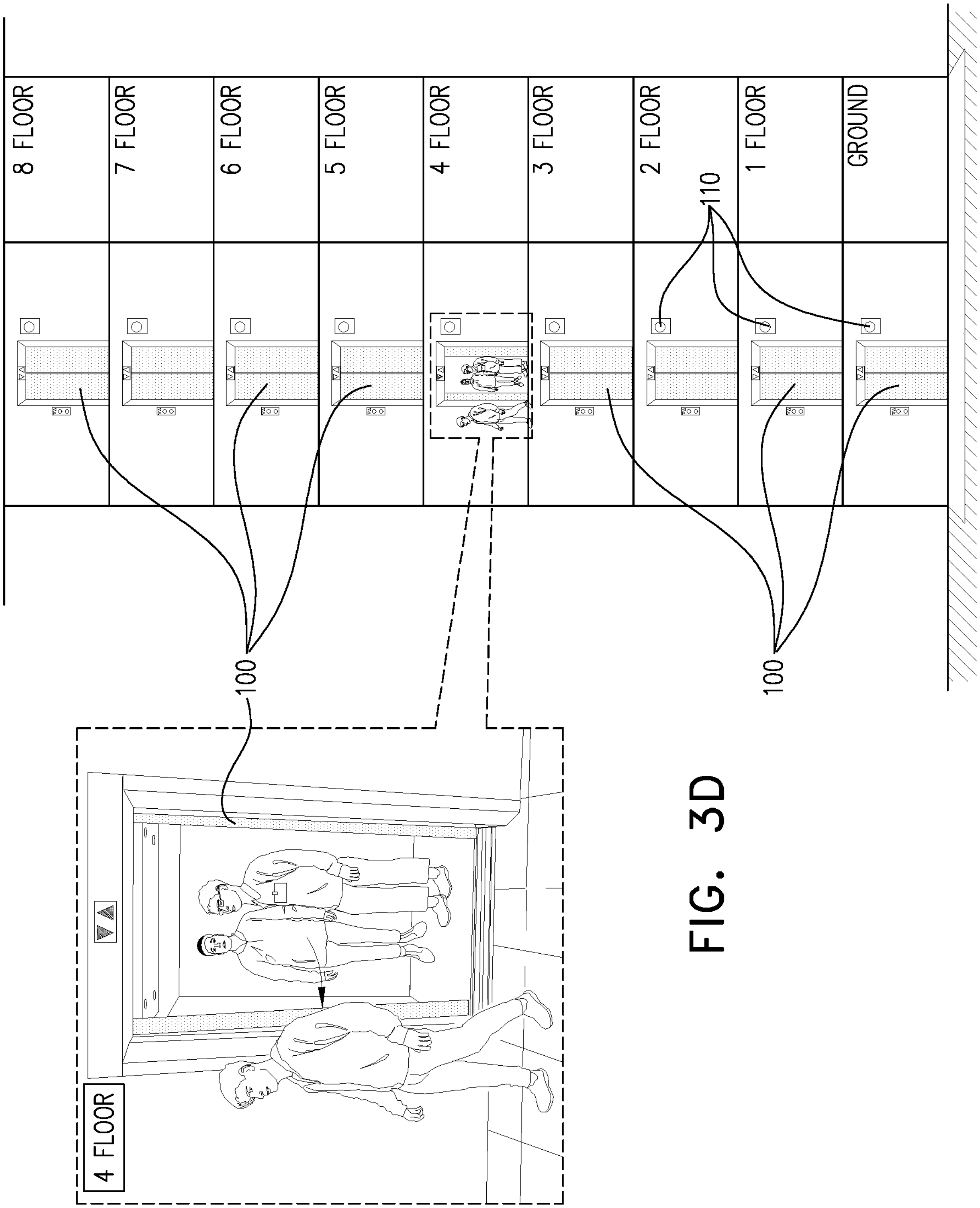

As shown in FIG. 3B, the elevator performs subroutine "B" when the elevator car is located at the ground floor. The elevator then proceeds with main routine "A", but does not perform subroutine "B" as illustrated in FIG. 3C, until it reaches the fourth floor, which is the pre-designated egress floor associated with the third user. When the elevator car reaches the fourth floor, the elevator performs subroutine "B", as illustrated in FIG. 3D.

Figure 3E:
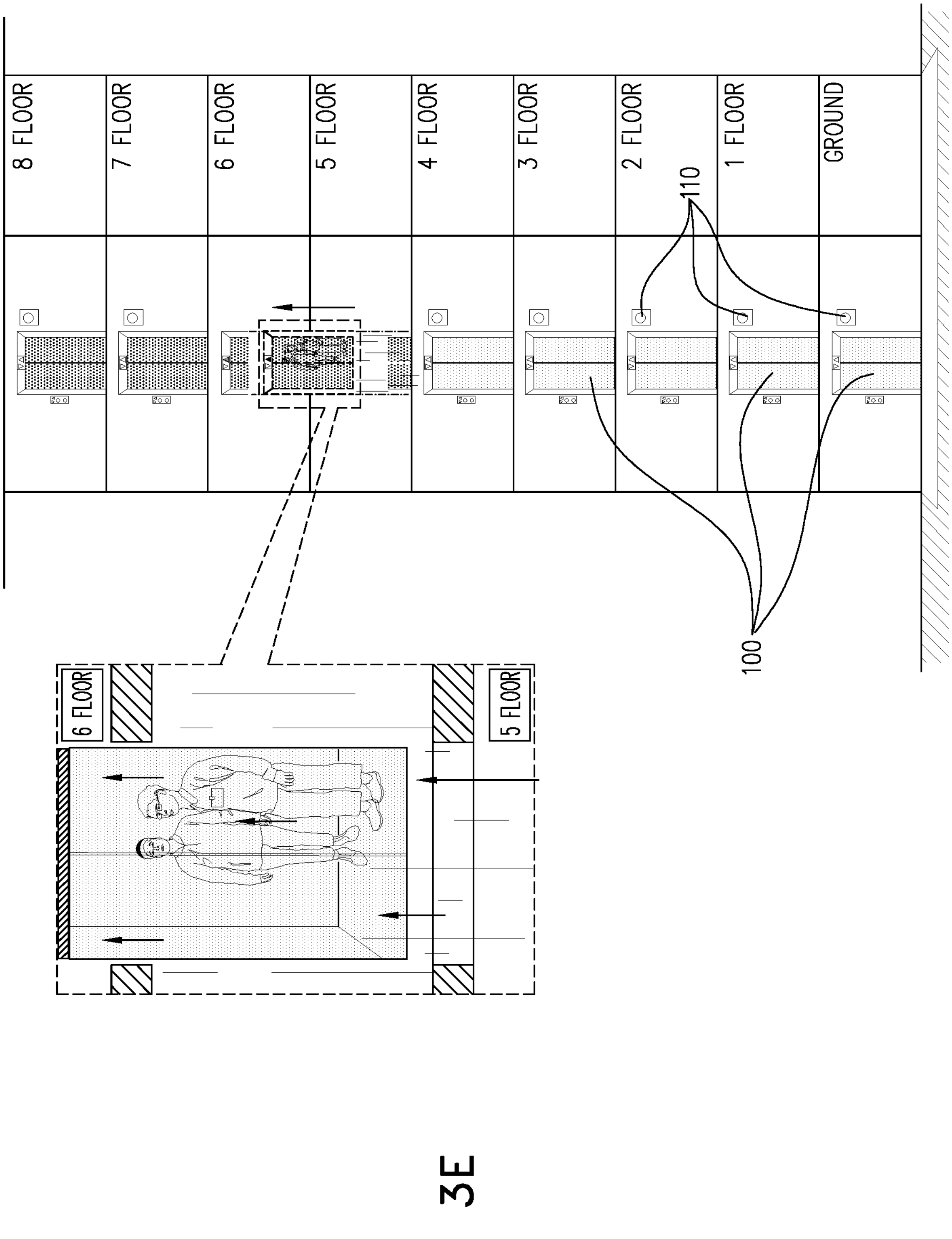
Figure 3F:
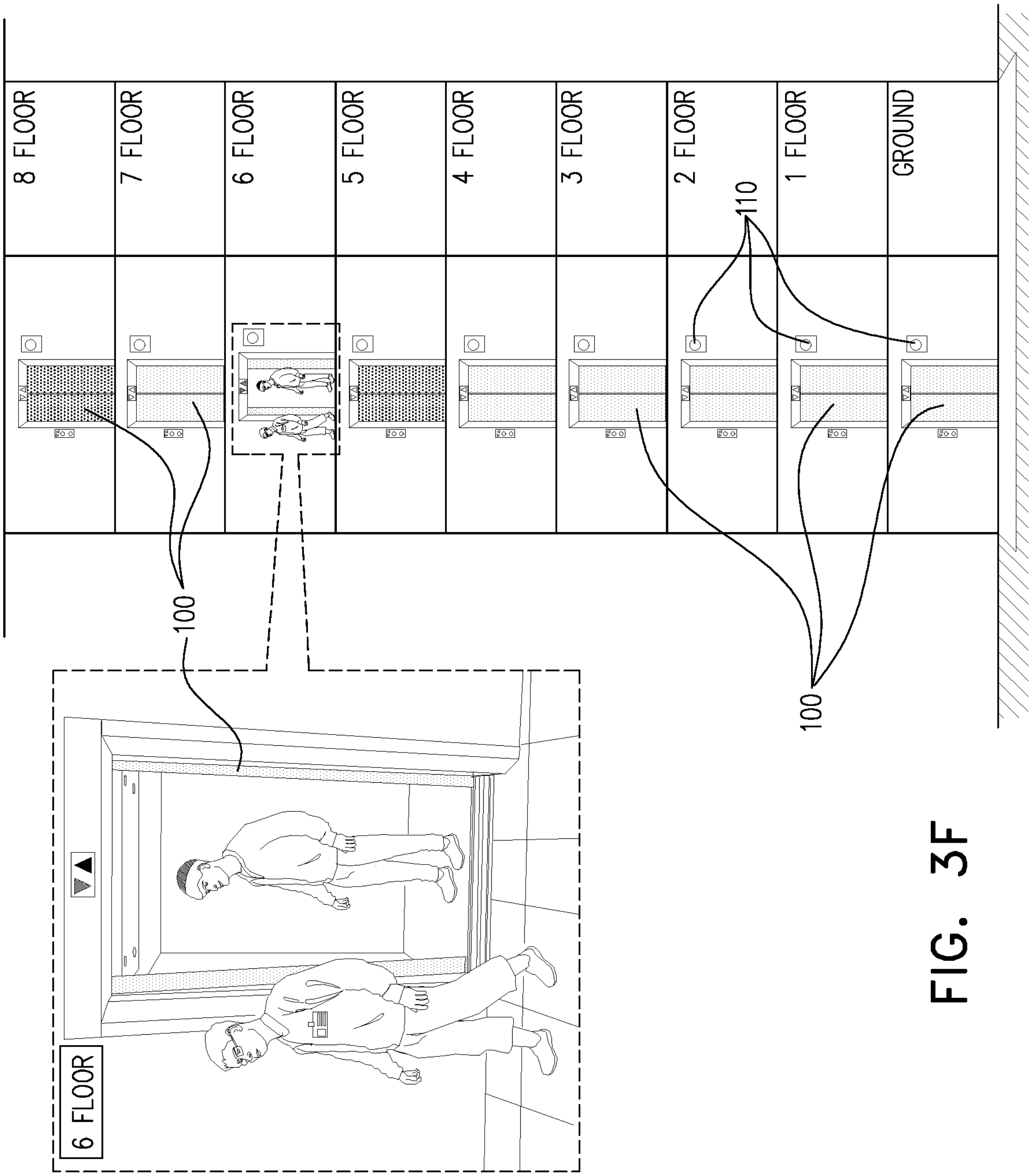

The elevator then proceeds with main routine "A", but does not perform subroutine "B", as illustrated in FIG. 3E, until the elevator car reaches the sixth floor, which is the pre-designated egress floor associated with the second user. When the elevator car reaches the sixth floor, the elevator performs subroutine "B", as illustrated in FIG. 3F.

Figure 3G:
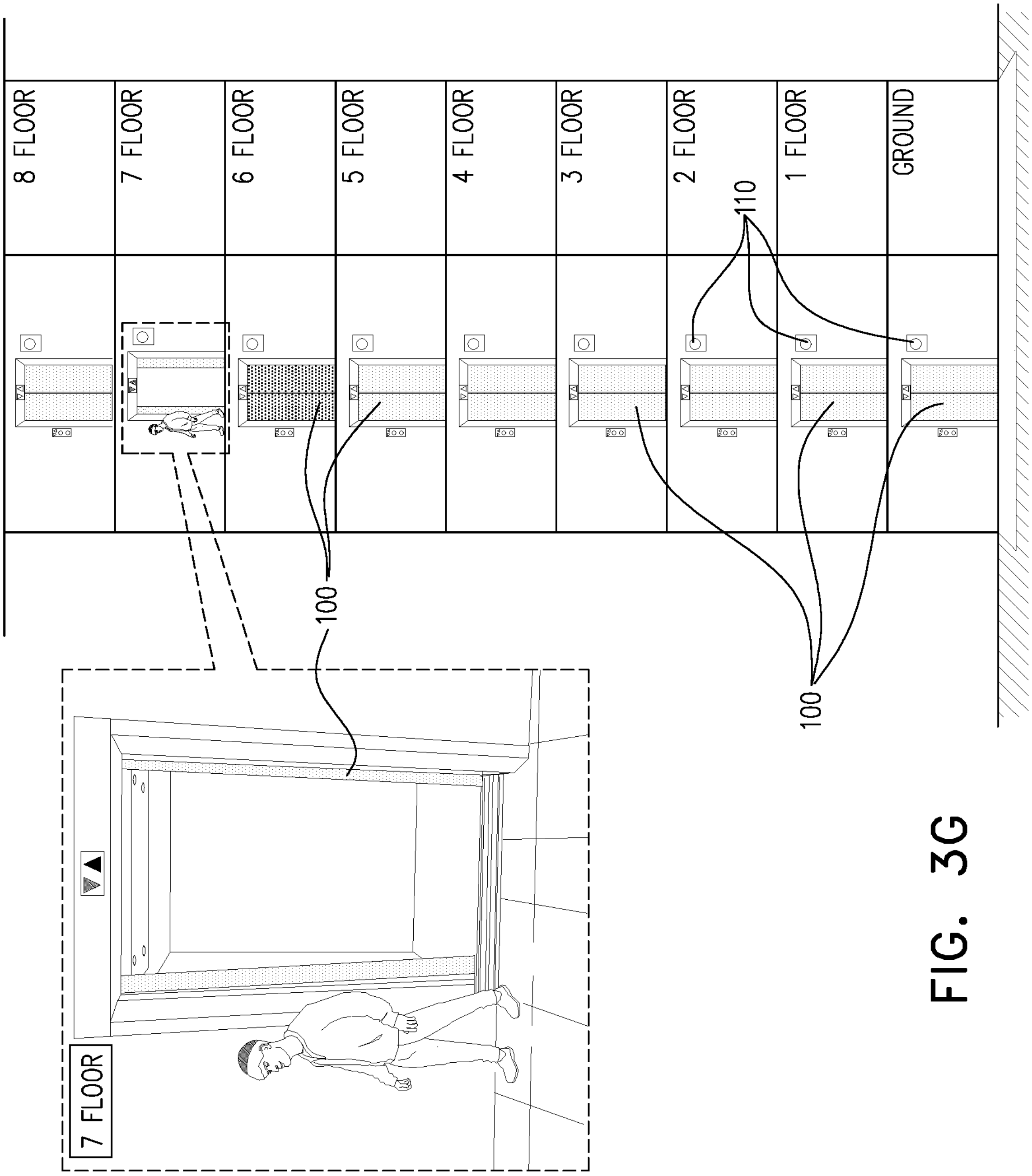

The elevator then proceeds with main routine "A", and reaches the seventh floor, which is the pre-designated egress floor associated with the first user. When the elevator car reaches the seventh floor, the elevator performs subroutine "B", as illustrated in FIG. 3G.

Figure 3H:
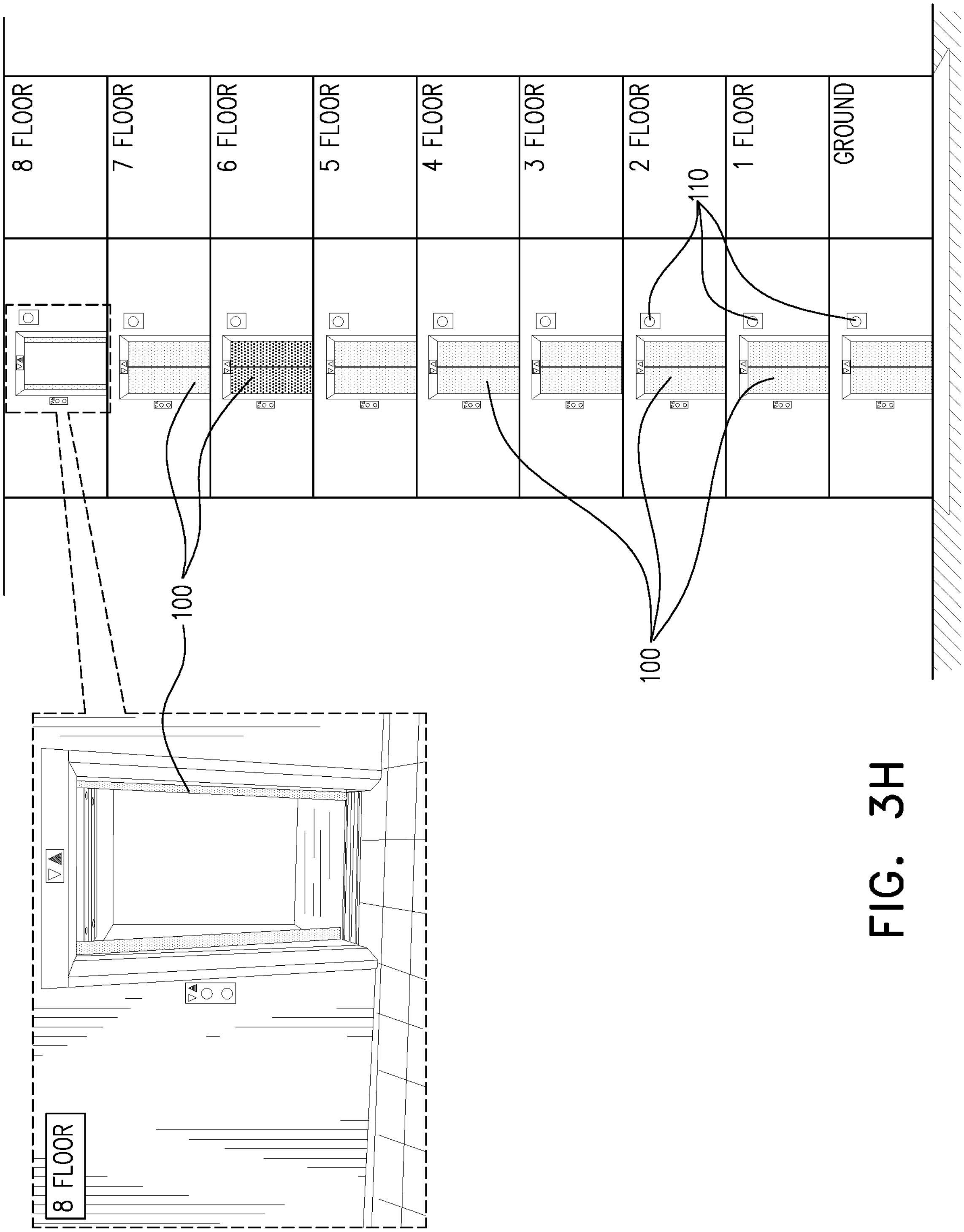
Figure 3I:
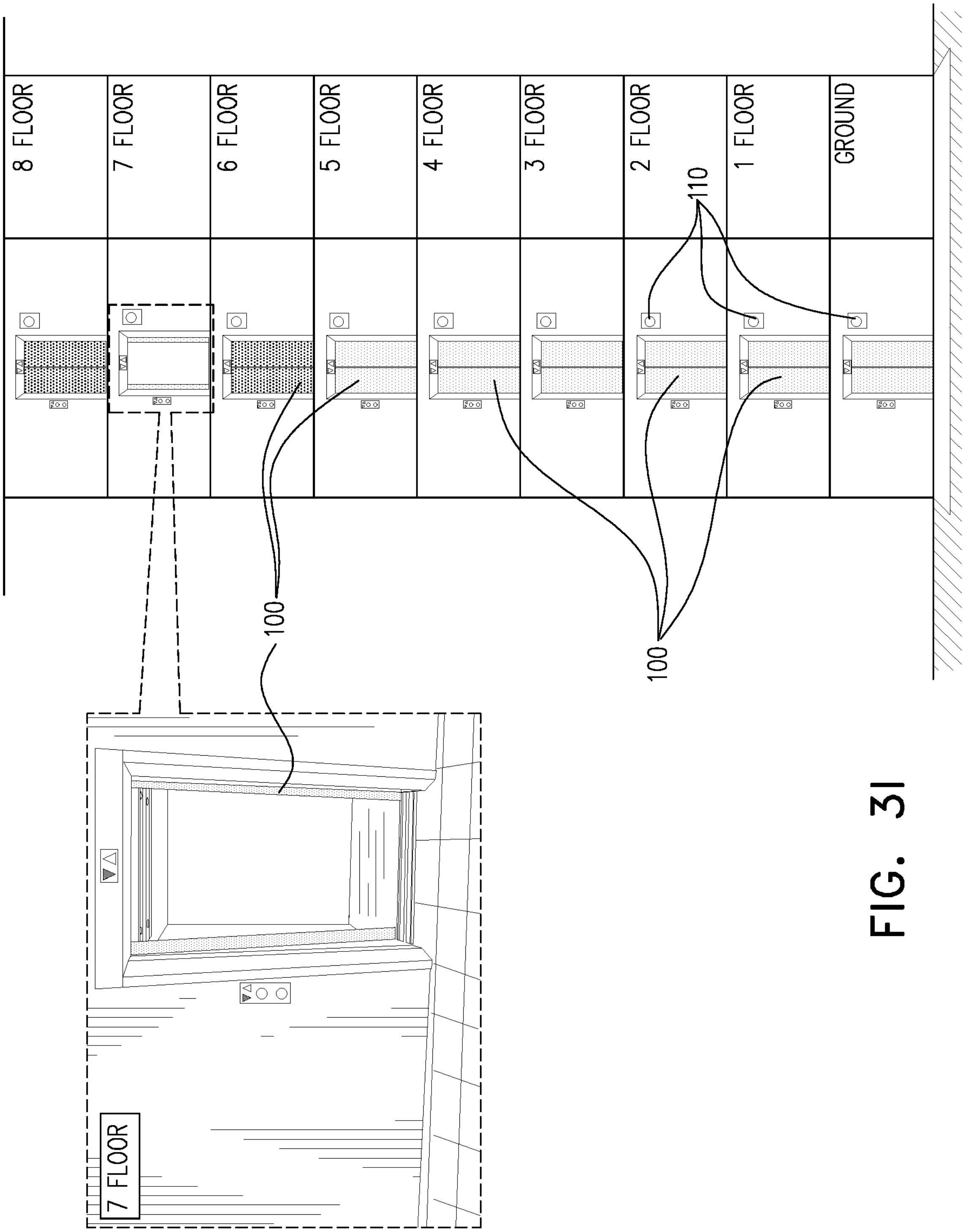
Figure 3J:
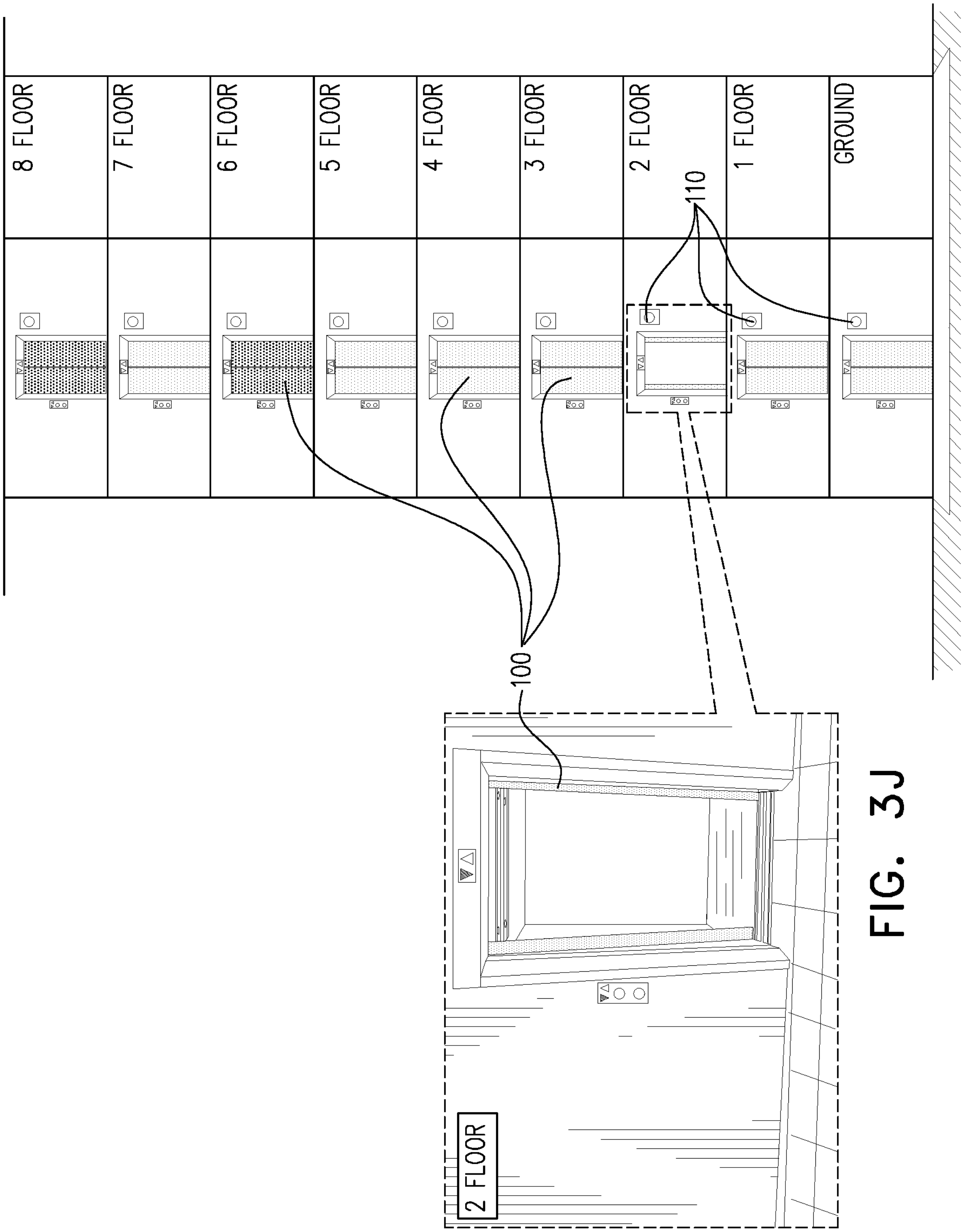
Figure 3K:
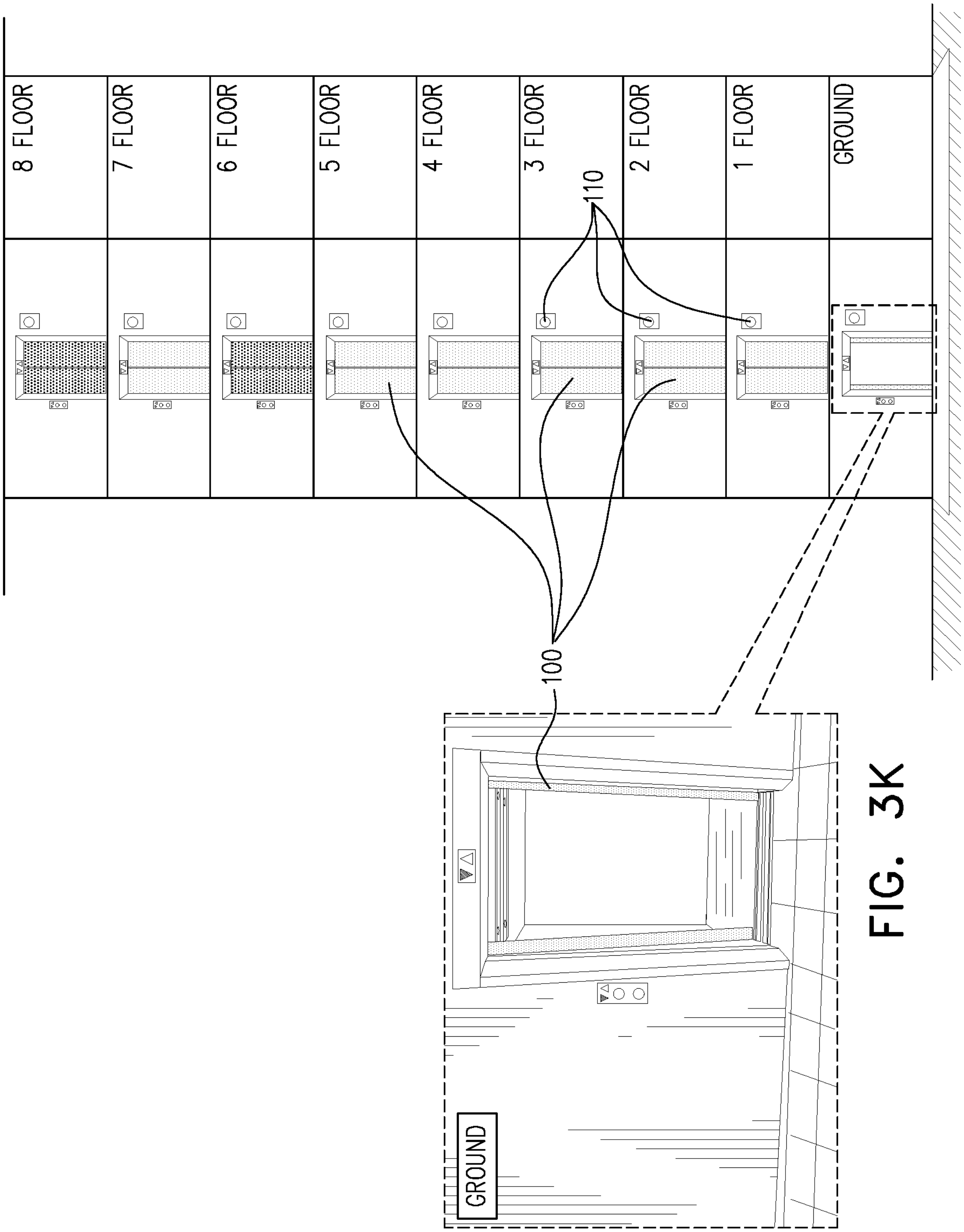

Following the egress of the last of the passengers in the elevator car, the elevator returns to normal Sabbath mode operation, continuing with main routine "A" and performing subroutine "B" at every pre-designated floor. FIG. 3H shows the elevator car at the eighth floor during performance of subroutine "B" thereat. As long as no user presence is sensed, elevator operation continues in the normal Sabbath mode, as illustrated in FIG. 3I, which shows performance of subroutine "B" at the seventh floor; FIGS. 3J and 3K which shows performance of subroutine "B" at subsequent pre-designated floors, the second floor and the ground floor, respectively.

It will be appreciated by persons skilled in the art that the present invention is not limited by what has been described hereinabove. Rather the present invention includes both combinations and sub-combinations of features described hereinabove as well as modifications thereof which are not in the prior art.

The invention claimed is:

1. A method for operating an elevator comprising:

operating said elevator in a pre-programmed sequence to stop at pre-designated floors in a predetermined order;

upon receipt of an indication, from a first user presence sensor, that a user at a given floor wishes to ride the elevator, temporarily not performing part of said pre-programmed sequence in order to arrive at the given floor with minimum delay; and thereafter, in the absence of another indication, from a second user presence sensor, that a user wishes to ride the elevator, continuing to temporarily not perform part of said pre-programmed sequence in order to arrive at a pre-designated egress floor with minimum delay; and thereafter operating said elevator in said pre-programmed sequence including performing said part of said pre-programmed sequence to stop at pre-designated floors at pre-programmed times until receipt of an indication, from a user presence sensor, that a user at a given floor wishes to ride the elevator.

2. A method for operating an elevator according to claim 1 and wherein said pre-programmed sequence includes:

a main routine wherein the elevator car moves upward floor by floor and downward floor by floor in a predetermined sequence; and a subroutine wherein the elevator car stops at a pre-designated floor, opens its doors, waits and then closes its doors.

3. A method for operating an elevator according to claim 2 and wherein said part of said pre-programmed sequence includes at least part of said subroutine.

4. A method for operating an elevator according to claim 2 and wherein said part of said pre-programmed sequence includes all of said subroutine.

5. A method for operating an elevator according to claim 1 and wherein in the presence of another indication, from said second user presence sensor, that a user wishes to ride the elevator at a different floor, the elevator car stops at said additional floor.

6. A method for operating an elevator according to claim 1 and wherein said indication that a user at a given floor wishes to ride the elevator is generated by at least one of:

sensing at least one of the presence of a person, an optical code and an RFID tag in predetermined propinquity to said elevator at said given floor; and the user operating an elevator call switch at said given floor.

7. A method for operating an elevator according to claim 1 and wherein said predetermined egress floor is selectably pre-programmed.

8. A method for operating an elevator according to claim 6 and wherein:

said indication that a user at a given floor wishes to ride the elevator is generated by sensing at least one of said optical code and said RFID tag in predetermined propinquity to said elevator at said given floor; and said predetermined egress floor is indicated by said at least one of said optical code and said RFID tag.

9. A method for operating an elevator according to claim 6 and wherein:

said indication that a user at a given floor wishes to ride the elevator is generated by the user operating an elevator call switch at said given floor; and said predetermined egress floor is indicated by said user.

10. A method for operating an elevator according to claim 1 and wherein, in the presence of an indication that an additional user wishes to ride the elevator, said method also comprises continuing to temporarily not perform part of said pre-programmed sequence in order to arrive at a floor at which the additional user is present with minimum delay, without departing from said predetermined order.

11. An elevator system comprising:

an elevator car arranged in an elevator shaft and having access to a plurality of pre-designated floors in a building;

an elevator car driving mechanism;

at least one user presence sensor arranged to sense the presence of a user at at least one of said plurality of pre-designated floors; and a computerized elevator controller, said computerized elevator controller being configured to:

operate said elevator in a pre-programmed sequence to stop at said pre-designated floors in a predetermined order;

upon receipt of an indication, from a first one of said at least one user presence sensor, that a user at a given floor wishes to ride the elevator, temporarily not performing part of said pre-programmed sequence in order to arrive at the given floor with minimum delay;

thereafter, in the absence of another indication from a second one of said at least one user presence sensor, that a user wishes to ride the elevator, continuing to temporarily not perform part of said pre-programmed sequence in order to arrive at a pre-designated egress floor with minimum delay; and thereafter operating said elevator in said pre-programmed sequence including performing said part of said pre-programmed sequence to stop at pre-designated floors at pre-programmed times until receipt of an indication, from one of said at least one user presence sensor, that a user at a given floor wishes to ride the elevator.

12. An elevator system according to claim 11 and wherein said pre-programmed sequence includes:

a main routine wherein the elevator car moves upward floor by floor and downward floor by floor in a predetermined sequence; and a subroutine wherein the elevator car stops at a pre-designated floor, opens its doors, waits and then closes its doors.

13. An elevator system according to claim 12 and said part of said pre-programmed sequence includes at least part of said subroutine.

14. An elevator system according to claim 12 and said part of said pre-programmed sequence includes all of said subroutine.

15. An elevator system according to claim 11 and wherein, in the presence of another indication, from said second one of said at least one user presence sensor, that a user wishes to ride the elevator at a different floor, the computerized elevator controller is operative to stop the elevator car at said additional floor.

16. An elevator system according to claim 11 and wherein said indication that a user at a given floor wishes to ride the elevator is generated by at least one of:

using said at least one user presence sensor to sense at least one of the presence of a person, an optical code and an RFID tag in predetermined propinquity to said elevator at said given floor; and the user operating an elevator call switch at said given floor.

17. An elevator system according to claim 11 and wherein said predetermined egress floor is selectably pre-programmed.

18. An elevator system according to claim 16 and wherein:

said indication that a user at a given floor wishes to ride the elevator is generated by using said at least one user presence sensor to sense at least one of said optical code and said RFID tag in predetermined propinquity to said elevator at said given floor; and said predetermined egress floor is indicated by said at least one of said optical code and said RFID tag.

19. An elevator system according to claim 16 and wherein:

said indication that a user at a given floor wishes to ride the elevator is generated by the user operating an elevator call switch at said given floor; and said predetermined egress floor is indicated by said user.

20. An elevator system according to claim 11 and wherein, in the presence of an indication that an additional user wishes to ride the elevator, said computerized elevator controller is operative to continue to temporarily not perform part of said pre-programmed sequence in order to arrive at a floor at which the additional user is present with minimum delay, without departing from said predetermined order.

* * * * *